US012724320B1

(12) United States Patent
Jayaraman et al.

(10) Patent No.: US 12,724,320 B1
(45) Date of Patent: Sep. 1, 2026

(54) WIDELY TUNABLE FREQUENCY DOUBLED LIGHT SOURCE

(71) Applicants: Vijaysekhar Jayaraman, Goleta, CA (US); Christopher Burgner, Santa Barbara, CA (US)

(72) Inventors: Vijaysekhar Jayaraman, Goleta, CA (US); Christopher Burgner, Santa Barbara, CA (US)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 18/109,236

(22) Filed: Feb. 13, 2023

Related U.S. Application Data

(60) Provisional application No. 63/310,861, filed on Feb. 16, 2022.

(51) Int. Cl.

*G02F 1/377* (2006.01)
*G01B 11/24* (2006.01)
*G02F 1/355* (2006.01)

(52) U.S. Cl.

CPC ........ *G02F 1/3775* (2013.01); *G01B 11/2441* (2013.01); *G02F 1/3551* (2013.01);

(Continued)

(58) Field of Classification Search

CPC .... G02F 1/3775; G02F 1/3551; G02F 1/3558; G02F 2202/20; G02F 2203/11; G01B 11/2441

See application file for complete search history.

(56) References Cited

U.S. PATENT DOCUMENTS 6,134,250 A * 10/2000 Koren ................ H04B 10/2914 372/6
7,061,622 B2 * 6/2006 Rollins .............. G01B 11/2441 356/497

(Continued)

FOREIGN PATENT DOCUMENTS

CN 109310328 B * 5/2022 ........... G01B 11/005
CN 113687556 B * 10/2023

OTHER PUBLICATIONS

Zhu Q, Xiao S, Hua Z, Yang D, Hu M, Zhu YT, Zhong H. Near Infrared (NIR) Light Therapy of Eye Diseases: a Review. Int J Med Sci. Jan. 1, 2021;18(1):109-119. (Year: 2021).*

(Continued)

*Primary Examiner* — Tarifur R Chowdhury
*Assistant Examiner* — Kemaya Nguyen
(74) *Attorney, Agent, or Firm* — Myers Wolin, LLC

(57) ABSTRACT

A widely tunable frequency doubled light source includes a fundamental widely tunable laser emitting fundamental radiation tuned over a fundamental wavelength range and a broadband nonlinear waveguide which frequency doubles the fundamental radiation over a frequency doubled wavelength range. A preferred implementation of the widely tunable laser is a MEMS-VCSEL followed by a semiconductor optical amplifier. Preferred implementations of the nonlinear waveguide include periodically poled lithium niobate with various means for broadening a conversion bandwidth, including dispersion engineering to reduce a group velocity mismatch between fundamental and frequency doubled wavelengths and employing a chirped poling period. Various optical systems are enabled by this new frequency doubled light source, including swept source optical coherence tomography (SSOCT) at previously inaccessible wavelength ranges, such as in the green/yellow gap range from about 500 nm to about 600 nm. Other optical (Continued)

systems enabled by the widely tunable frequency doubled light source include systems for optical spectroscopy, beam steering, Raman spectroscopy, and wavelength division multiplexed optical communications.

19 Claims, 12 Drawing Sheets

(52) U.S. Cl.
CPC ........ *G02F 1/3558* (2013.01); *G02F 2202/20* (2013.01); *G02F 2203/11* (2013.01)

(56) References Cited

U.S. PATENT DOCUMENTS

| | | | | |
|---|---|---|---|---|
| 10,170,886 | B2* | 1/2019 | Leonardo | H01S 3/094046 |
| 2002/0176472 | A1* | 11/2002 | Arbore | G02F 1/39 372/72 |
| 2005/0238070 | A1* | 10/2005 | Imeshev | G02F 1/39 359/326 |
| 2012/0200912 | A1* | 8/2012 | Hodgson | H01S 3/0092 359/330 |
| 2013/0044771 | A1* | 2/2013 | Minneman | H01S 5/0652 372/20 |
| 2014/0036939 | A1* | 2/2014 | Fermann | H01S 3/06754 372/18 |
| 2014/0268169 | A1* | 9/2014 | Jayaraman | H01S 5/18366 372/20 |
| 2022/0252958 | A1* | 8/2022 | Fejer | G02F 1/3558 |
| 2023/0273503 | A1* | 8/2023 | Leo | G02F 1/3503 359/330 |
| 2024/0361665 | A1 | 10/2024 | Zhang et al. | |

OTHER PUBLICATIONS

Fan et al., "Swept-source visible-light optical coherence tomography," Optical Letters, published Jan. 27, 2025, pp. 928-931, vol. 50, No. 3, Optica Publishing Group.

Yi, et al., "Visible-light optical coherence tomography for retinal oximetry," Optics Letters, published May 20, 2013, pp. 1796-1798, vol. 38, No. 11, Optical Society of America.

* cited by examiner

110

127 nm

Log Inensity (au)

-10
-20
-30
-40
-50
-60
-70
-80
-90

950 1000 1050 1100 1150

Wavelength, nm

WIDELY TUNABLE FREQUENCY DOUBLED LIGHT SOURCE

CROSS REFERENCES TO RELATED APPLICATIONS

This application claims the benefit of U.S. Provisional Patent Application No. 63/310,861 filed on Feb. 16, 2022. The disclosure of U.S. Provisional Patent Application 63/310,861 is hereby incorporated by reference.

FIELD OF THE INVENTION

The present invention relates to tunable light sources, widely tunable light source, wavelength swept light sources, tunable visible light sources, tunable ultraviolet light sources, rapidly tuned lasers and light sources, wavelength division multiplexed laser arrays, optical coherence tomography, tunable diode laser spectroscopy, Raman spectroscopy, optical communications, and other optical systems enabled by these devices.

BACKGROUND

Throughout this specification, the term “laser” may apply not only to simple lasers, but also to light sources which comprise a laser with another active or passive device that changes the amplitude or wavelength of the laser, such as a laser followed by an optical amplifier, or a laser followed by a frequency conversion element that changes the laser wavelength through a non-linear optical process. Lasers combined with amplifiers or frequency conversion devices may also be referred to as light sources. Also throughout this specification, the terms “frequency doubling” and “second harmonic generation” may be used interchangeably.

We define widely tunable lasers as lasers which can achieve a fractional wavelength tuning range $\Delta\lambda/\lambda$ that exceeds the maximum fractional refractive index change $\Delta n/n$ achievable in any section of the laser optical cavity, where $\lambda$ is the center wavelength of the tuning range, $\Delta\lambda$ is the wavelength tuning range, n is the nominal refractive index in a section of the optical cavity, and $\Delta n$ is the maximum achievable refractive index change in that section of the optical cavity. The fractional index change $\Delta n/n$ using normal refractive index tuning means in semiconductors, such as carrier injection, is generally <1%, and our definition of widely tunable lasers therefore includes lasers with $\Delta\lambda/\lambda>1\%$. Widely tunable lasers employ mechanisms like vernier or mechanical tuning to achieve wider tuning ranges than achievable by pure refractive index tuning. Widely and rapidly tunable lasers are important for a variety of detection, communication, measurement, therapeutic, sample modification, and imaging systems. Wavelength division multiplexed communication systems near 1550 nm, for example, use laser tuning to access different optical channels at different wavelengths across the 35 nanometer (nm) gain bandwidth of Erbium doped fiber amplifiers, and multiple wavelengths may be transmitted simultaneously down a single optical fiber. Swept source optical coherence tomography (SSOCT) systems provide an example of widely tunable lasers in imaging, employing repetitively swept widely tunable lasers to generate subsurface microstructural and functional images of a wide range of biological and non-biological materials. In SS-OCT, wide tuning range translates to higher axial measurement resolution, and higher tuning speed enables real-time acquisition of larger data sets. Shorter wavelength also affords higher axial measurement resolution, since the axial spatial resolution for a Gaussian shaped spectrum is given by $0.44*\lambda^2/\Delta\lambda$, where $\lambda$ is the center wavelength of the tuned spectrum, and $\Delta\lambda$ is the wavelength tuning range. In addition, variable tuning speed enables trading off imaging range and resolution as required for different applications. Lastly, long coherence length, which is equivalent to narrow linewidth, enables long imaging range. Another example of a system which requires rapidly and widely tunable lasers is transient gas spectroscopy as, for example, described in (Stein, B. A., Jayaraman, V. Jiang, J. J, et al., “Doppler-limited H20 and HF absorption spectroscopy by sweeping the 1321-1354 nm range at 55 kHz repetition rate using a single-mode MEMS-tunable VCSEL,” Applied Physics B: Lasers and Optics 108(4), 721-5 (2012)). In gas spectroscopy, tuning speed enables characterization of time-varying processes, such as in engine thermometry. Narrow spectral width enables resolution of narrow absorption features, such as those that occur at low gas temperatures. Other transient spectroscopic applications include monitoring of explosive or other non-repetitive processes.

Widely tunable lasers of various types have been established at many near infrared and longer wavelengths. These lasers can be broadly classified into non-monolithic devices, in which the laser cavity must be assembled by discrete components requiring manual intracavity alignments, and monolithic devices, in which the entire laser cavity can be fabricated wafer scale using established and emerging semiconductor device fabrication methods. Among non-monolithic lasers, external cavity tunable lasers (ECTL) at 1050 nanometers (nm), 3300 nm, 8000 nm, and many other wavelengths for instrumentation and spectroscopy applications have achieved fractional tuning range of >10%. Quantum cascade lasers are among the most widely tunable lasers, and external cavity lasers with stacked active regions have demonstrated a fractional tuning range of over 30%, as described in (A. Hugi, R. Maulini, and J. Faist, “External cavity quantum cascade laser,” *Semiconductor Science and Technology*, vol. 25, no. 8, p. 083001, 2010.). ECTL lasers generally tune more slowly than monolithic tunable lasers, due to slower movement of bulky mechanical components and longer laser roundtrip buildup times in long external cavities. Nevertheless, some ECTL devices employing MEMS devices, such as short cavity devices with MEMS tuning and Fourier Domain Mode-Locked (FDML) lasers with tunable Fabry-Perot MEMS-filters have achieved wavelength repetition rates of several hundred kHz over 10% fractional tuning ranges. An FDML laser is described in (Huber, R., Adler, D. C., and Fujimoto, J. G., “Buffered Fourier domain mode locking: unidirectional swept laser sources for optical coherence tomography imaging at 370, 000 lines/s,” Optics Letters, 31(20), 2975-2977 (2006)). Use of a short-cavity commercial ECTL in an SSOCT system is described in (George, B., Potsaid, B., Baumann, B., Huang, D. et al., “Ultrahigh speed 1050 nm swept source/Fourier domain OCT retinal and anterior segment imaging at 100, 000 to 400,000 axial scans per second,” Optics Express, 18(19), 20029-20048 (2010)). FDML and ECTL devices are essentially multi-longitudinal mode devices, which sweep a cluster of modes instead of a single mode across a tuning range. This results in limited imaging range for SSOCT and limited spectral resolution for spectroscopic applications. As already mentioned, both FDML and ECTL are also non-monolithic sources, which are assembled from discrete components which require precise intra-cavity laser alignments and are therefore not low-cost devices or compatible with array fabrication. Many ECTL devices further suffer from fundamental speed limitations of about 200 kHz repetition rate or less, due to the long time delay in the external cavity, as described in (Huber, R., Wojtkowski, M., Taira, K. et al., "Amplified, frequency swept lasers for frequency domain reflectometry and OCT imaging: design and scaling principles," Optics Express, 13(9), 3513-3528 (2005).) Further speed limitations in some ECTL devices arise from the large mass of the grating tuning element. The FDML suffers also from inflexiblity of both center wavelength and tuning speed. Since the FDML employs a long fiber-based cavity, it can only operate at wavelengths where low-loss and low dispersion optical fiber is readily available, and the FDML has therefore never been demonstrated at wavelengths<1000 nm. Secondly, the FDML sweep rate is fixed by the roundtrip time of light in the fiber external cavity, and variable sweep rates are therefore not possible in a single device.

Monolithic widely tunable lasers are preferable to non-monolithic devices like ECTLs and FDMLs, because of wafer scale fabrication and volume scalability for commercial applications, as well as generally faster tuning speeds and other performance advantages. Among monolithic widely tunable lasers, micro-electromechanical systems vertical cavity surface emitting lasers (MEMS-VCSELs) at 1050 nm, 1310 nm, and 1550 nm have achieved the widest tuning ranges in the near infrared, with >11% fractional tuning range achieved at 1050 nm, 1310 nm, and 1550 nm. FIG. 1A shows the structure of a prior art optically pumped 1050 nm MEMS-VCSEL 100, showing a dynamic tuning range of 127 nm in FIG. 1B via a dynamic tuning spectrum 110. FIG. 1C shows the structure of a prior art optically pumped 1310 nm MEMS-VCSEL 120, exhibiting a set of dynamic and static spectra 130 over a total tuning range of 150 nm in FIG. 1D. MEMS-VCSELs operate with continuous single mode tuning over the full tuning range making them ideal for swept wavelength applications and SS-OCT imaging with minimal artifacts. Widely tunable MEMS-VCSELs are inherently wavelength flexible and can be fabricated at most near infrared wavelengths where fixed-wavelength VCSELs can be fabricated. Tunable sampled grating distributed bragg reflector lasers (SGDBR) described in (V. Jayaraman, Z.-M. Chuang, and L. A. Coldren, "Theory, design, and performance of extended tuning range semiconductor lasers with sampled gratings," *IEEE J. Quantum Electron*., vol. 29, no. 6, pp. 1824-1834, 1993.), alternately called vernier-tuned distributed bragg reflector (VTDBR) lasers, are also monolithic tunable lasers, used for WDM telecommunications at 1550 nm. SGDBR lasers have achieved about 4% fractional tuning range, with about 2% typically used in practice. Although SGDBRs are well established in "set and hold" WDM communications applications, they are not well suited for swept applications like SS-OCT. Operation of an SGDBR laser for wavelength swept application in SS-OCT is described in (Derickson, D., "High-Speed Concatenation of Frequency Ramps Using Sampled Grating Distributed Bragg Reflector Laser Diode Sources for OCT Resolution Enhancement," Proceedings of the SPIE—The International Society for Optical Engineering, 7554, (2010)). Tuning is accomplished by discontinuous hopping amongst various modes, which tends to introduce measurement artifacts. The mode-hopping also requires multiple tuning electrodes, complicated drive circuitry and associated speed limitations. The SGDBR also suffers from limited tuning range relative to MEMS-VCSEL, external cavity and FDML lasers, since the latter use lossless tuning mechanisms, while the SGDBR is tuned by free carrier injection, which introduces free carrier losses and limits tuning range. The SGDBR also suffers from center wavelength inflexibility, due to the need for complex regrowth fabrication technology which is only mature in the Indium Phosphide material system at wavelengths longer than about 1200 nm.

Beyond wide tunability, monolithic fabrication, and continuous single mode tuning already noted above, other desirable parameters for tunable lasers for a variety of applications include tuning speed and variability of tuning speed. In SSOCT, increased tuning speed enables imaging of time-varying physiological processes, as well as real-time volumetric imaging of larger data sets. Also for SSOCT, variability of tuning speed enables switching between high speed, high resolution short-range imaging, and low speed, low resolution long range imaging in a single device, which is of great utility in, for example, ophthalmic imaging, as described in (Grulkowski, I., Liu, J. J., Potsaid, B. et al., "Retinal, anterior segment and full eye imaging using ultrahigh speed swept source OCTwith vertical-cavity surface emitting lasers," Biomed. Opt. Express, 3(11), 2733-2751 (2012)). Spectroscopic or other detection applications benefit in analogous ways from high-speed and variable speed.

Further desirable properties of widely tunable lasers include high output power and spectrally shaped output. High power increases signal to noise ratio for virtually every application. Spectrally shaped output also increases signal to noise ratio and improves thermal management.

Although various types of monolithic and non-monolithic widely tunable lasers have achieved >10% fractional tuning range at wavelengths longer than about 1000 nm, at wavelengths less than about 1000 nm, tuning ranges are dramatically smaller, especially at wavelengths less than about 800 nm. One of the widest tuning ranges has been demonstrated at 850 nm, using an electrically pumped MEMS-VCSEL with demonstrated 37.7 nm tuning range, corresponding to a fractional tuning range of about 4.4%, as discussed in (D. D. John et al., "Single-Mode and High-Speed 850 nm MEMS-VCSEL," in *Advanced Solid State Lasers,* 2016: Optical Society of America, p. ATh5A. 2.) About 2.5% tuning range has been demonstrated at 980 nm, as shown in (C. J. Chang-Hasnain, "Tunable VCSEL," *IEEE J. Sel. Top. Quantum Electron*., vol. 6, no. 6, pp. 978-987, November-December 2000, doi: 10.1109/2944.902146.). Below 800 nm, few if any widely tunable semiconductor lasers exist. Non-monolithic external cavity Gallium Nitride lasers have demonstrated at least 4 nm of tuning near 405 nm, corresponding to about 1% fractional tuning, as discussed in (D. Ding, X. Lv, X. Chen, F. Wang, J. Zhang, and K. Che, "Tunable high-power blue external cavity semiconductor laser," *Optics & Laser Technology*, vol. 94, pp. 1-5, 2017.), but these devices require complex precision alignments (even more so than NIR ECTLs, because of the shorter wavelength) and are not volume scalable. At these short visible wavelengths, tuning range is limited by the vary narrow gain bandwidth available in Gallium Nitride (GaN) materials, as well as in AlInGaP materials from 630-720 nm. Superluminescent light emitting diodes (SLEDs) in the 420 nm range exhibit a bandwidth around 5 nm, as discussed in (E. Feltin et al., "Broadband blue superluminescent light-emitting diodes based on GaN," *Applied Physics Letters*, vol. 95, no. 8, p. 081107, 2009.), which is indicative of a gain bandwidth in the range of 5 nm. Although a few modestly tuned external cavity tunable lasers have been reported at <1000 nm, few monolithic widely tunable semiconductor lasers exist in this range (excepting the 2.5/4.4% fractional tuning of 980/850 nm MEMS-VCSEL described above). SGDBRs have not been successfully fabricated at wavelengths<1000 nm because of the absence of regrowth technology on GaAs and GaN substrates. Similarly, widely tunable MEMS-VCSELs with 10% fractional tuning range are difficult to fabricate at <1000 nm, not only because of gain bandwidth limitations but because of the absence of suitable broadband semiconductor mirrors at shorter wavelengths. Use of transparent AlGaAs/AlAs mirrors leads to decreasing refractive index contrast and decreasing mirror bandwidth at shorter wavelengths below 1000 nm. On GaN substrates, no lattice matched mirror exists, and use of strained AlGaN/GaN mirrors produces low reflectivity and very narrow mirror bandwidth.

In addition to the absence of wide gain bandwidth and wide mirror bandwidth, the wavelength region below 1000 nm also includes spectral gaps where no established semiconductor gain media exist. The so-called green/yellow gap exists between about 530 and 620 nm, where semiconductor lasers are largely absent. FIG. 2, reproduced from (H. Ohta, S. P. DenBaars, and S. Nakamura, "Future of group-III nitride semiconductor green laser diodes," *JOSA B*, vol. 27, no. 11, pp. B45-B49, 2010.) shows maximum output power and wallplug efficiency as a function of wavelength from 380-700 nm, which illustrates the absence of lasers in a spectral region 140 comprising the green/yellow gap from about 530 nm to about 620 nm. Although FIG. 2 provides data from 2010, little has changed in this wavelength range since then. For InGaN quantum wells (QW) on GaN, increasing Indium content is needed for longer wavelengths, but strain limitations preclude pushing this wavelength beyond about 530 nm. For Aluminum Indium Gallium Phosphide (AlInGaP) QW on GaAs, decreasing energetic barrier height between the QW and quantum barrier with decreasing wavelength leads to increasing carrier overflow and quenching of lasing below about 620 nm.

Three proposed solutions to the green gap found in the literature are InGaN quantum dots (QD), InGaN nanocrystal surface emitting lasers (NCSELs), and colloidal quantum dots (CQD). InGaN QD can incorporate greater Indium content and greater strain than InGaN QW due to breakup of the 1D QW into 2D islands. Room temperature, continuous wave, fixed wavelength InGaN QD VCSELs have been demonstrated by one group with devices demonstrating multi-longitudinal mode lasing from 491.8 nm to 565.7 nm, as discussed in (Y. Mei et al., "Quantum dot vertical-cavity surface-emitting lasers covering the 'green gap'," *Light: Science & Applications*, vol. 6, no. 1, pp. e16199-e16199, 2017.). Maximum power, however, was limited to 6 μW across the tuning range. The low power is a fundamental consequence of the low gain, which necessitated a dielectric output mirror with a calculated reflectance of 99.99%, allowing very little power to couple out of the laser cavity. Additionally, the high thermal power dissipation in these devices (with 6× drive voltage of typical NIR VCSELs) contributed to early thermal rollover with increasing current.

InGaN NCSELs exploit a photonic band edge resonance to enable surface emission without mirrors. These devices have achieved a maximum RTCW output power of 15 uW, and a maximum wavelength of 523 nm as discussed in (Y.-H. Ra, R. T. Rashid, X. Liu, S. M. Sadaf, K. Mashooq, and Z. Mi, "An electrically pumped surface-emitting semiconductor green laser," *Science advance*s, vol. 6, no. 1, p. eaav7523, 2020.). Although theoretical predictions indicate wavelength could achieve operation in the green gap from 530-600 nm, this has yet to be demonstrated. Additionally, the wavelength in NCSELs is determined entirely by nanopillar geometry, so these devices are suitable for fixed wavelength operation and cannot be configured as tunable devices.

An optically pumped green gap VCSEL using Cadmium Selenide/Cadmium Sulfide (CdSe/CdS) colloidal quantum dots (CQD) was demonstrated in 2012 under room temperature pulsed excitation with 100 femtosecond (fs) pulses, as discussed in (C. Dang, J. Lee, C. Breen, J. S. Steckel, S. Coe-Sullivan, and A. Nurmikko, "Red, green and blue lasing enabled by single-exciton gain in colloidal quantum dot films," *Nature nanotechnology*, vol. 7, no. 5, pp. 335-339, 2012.). Both 560 nm and 610 nm wavelengths were achieved in separate VCSELs using different size CQD. Output powers were not reported, and though other pulsed laser demonstrations have followed, significant thermal challenges have thus far prevented continuous wave operation in the 9 years since the initial pulsed demonstration.

As mentioned above, today's widest monolithic tunable lasers are MEMS-VCSELs, and MEMS-VCSELs possess other desirable tuning properties such as high and variable tuning speed, continuous single-mode tuning, long coherence length and wafer scale fabrication of the optical cavity. Therefore MEMS-VCSELs in the green-yellow gap from 530-620 nm would be of great utility. As discussed above, however, the development of MEMS-tunable VCSELs at visible wavelengths has also been precluded by the lack of a broadband gain media and broadband semiconductor mirrors in the green gap.

In addition to the green gap, the region from about 710 nm-770 nm is also very difficult to access with semiconductor lasers as it is at the extremes of semiconductor alloy systems, much like the 530-620 nm green/yellow gap. On the short end near 710 nm, AlInGaP QW cannot access this range with good efficiency and on the long end at 770 nm increasing aluminum content in AlGaAs QW reduces efficiency relative to pure GaAs QW. Tunable lasers in this range are essentially non-existent, due to the low index contrast and narrow reflection band of GaAs/AlGaAs mirrors for MEMS-VCSELs and the inefficiency of gain media.

From the foregoing, it is clear that what is required is a widely tunable light source operating at less than about 1000 nm, and optical systems enabled by these widely tunable light sources. In addition to wide tunability, long coherence length, monolithic fabrication of the laser cavity, and continuous single mode tuning with high and variable tuning speed at <1000 nm are needed for high-resolution and visible SSOCT imaging systems, spectroscopic detection systems and other types of optical systems including wavelength division multiplexed communications and Raman spectroscopy.

SUMMARY

This document provides several preferred embodiments of widely tunable frequency doubled light sources and optical systems employing these light sources. A preferred wavelength range is less than about 1000 nm, where widely tunable lasers are largely absent in the prior art. Preferred embodiments of the light source comprise a first widely tunable laser emitting fundamental radiation over a fundamental wavelength range having a fundamental center wavelength, and a nonlinear waveguide configured for broadband second harmonic generation (SHG). The nonlinear waveguide, which preferably uses a periodically poled lithium niobate (PPLN) core, converts fundamental radiation entering at an input side to SHG radiation, alternately called frequency doubled radiation, at an output side, having a frequency doubled center wavelength that is half of the fundamental center wavelength, where wavelength is defined in air.

Preferred embodiments of the nonlinear waveguide include high contrast waveguides to achieve group velocity matching between fundamental and frequency doubled center wavelengths, a poling period which varies along the length of the waveguide, or equivalently a varying waveguide effective index accomplished for example by varying waveguide width. Preferred embodiments also include an optical amplifier amplifying said fundamental radiation and increasing an efficiency of the conversion of said fundamental radiation to frequency doubled radiation. Other preferred embodiments include adjusting a pump power to the first widely tunable laser or the optical amplifier to achieve spectrally shaped operation.

Preferred embodiments of optical systems employing this widely tunable light source include systems for optical coherence tomography, preferably visible optical coherence tomography. Additional preferred embodiments of optical systems include systems for optical spectroscopy, systems for non-mechanical beam steering, systems for swept source optical coherence tomography and communication systems employing plastic optical fiber or operating in undersea environments. Several preferred imaging and detection system embodiments make use of this tunable source for optimized operation.

DETAILED DESCRIPTION

Figures 1A, 1B:
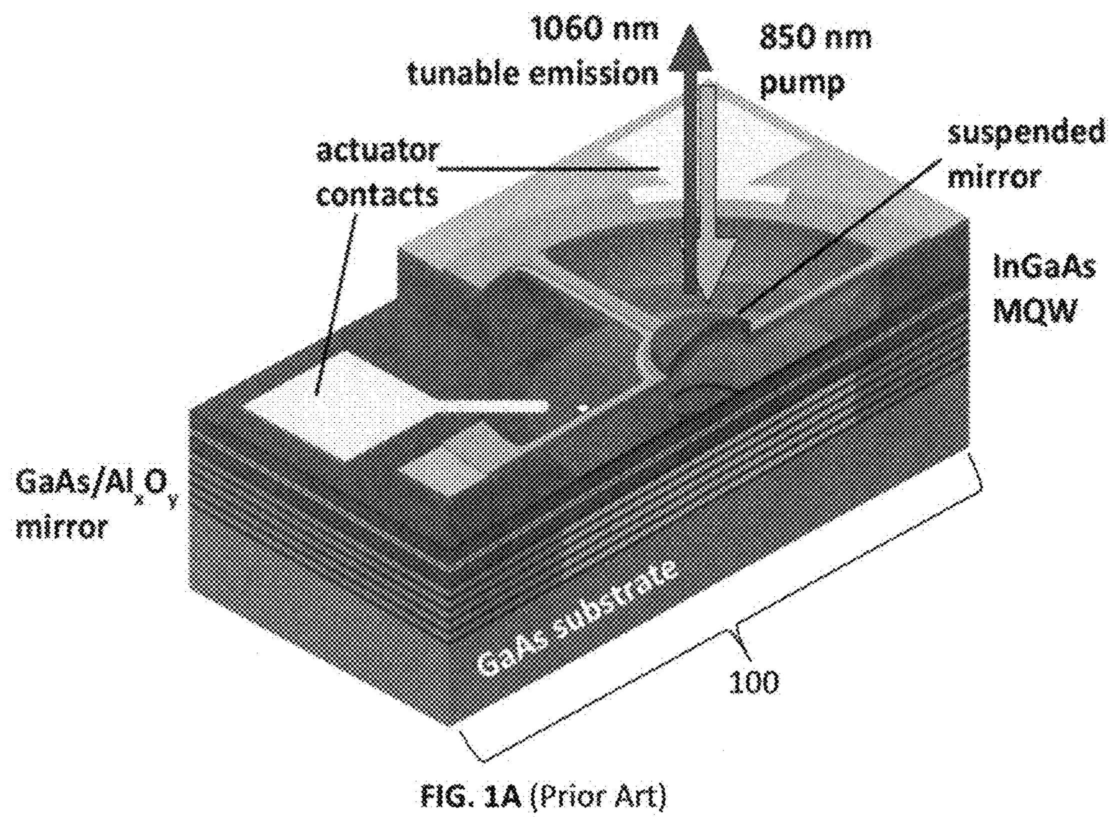
FIG. 1A illustrates a prior art MEMS-VCSELs operating near 1060 nm.
FIG. 1B illustrates a prior art tuning spectrum of the prior art MEMS-VCSEL in FIG. 1A.
Figure 1C:
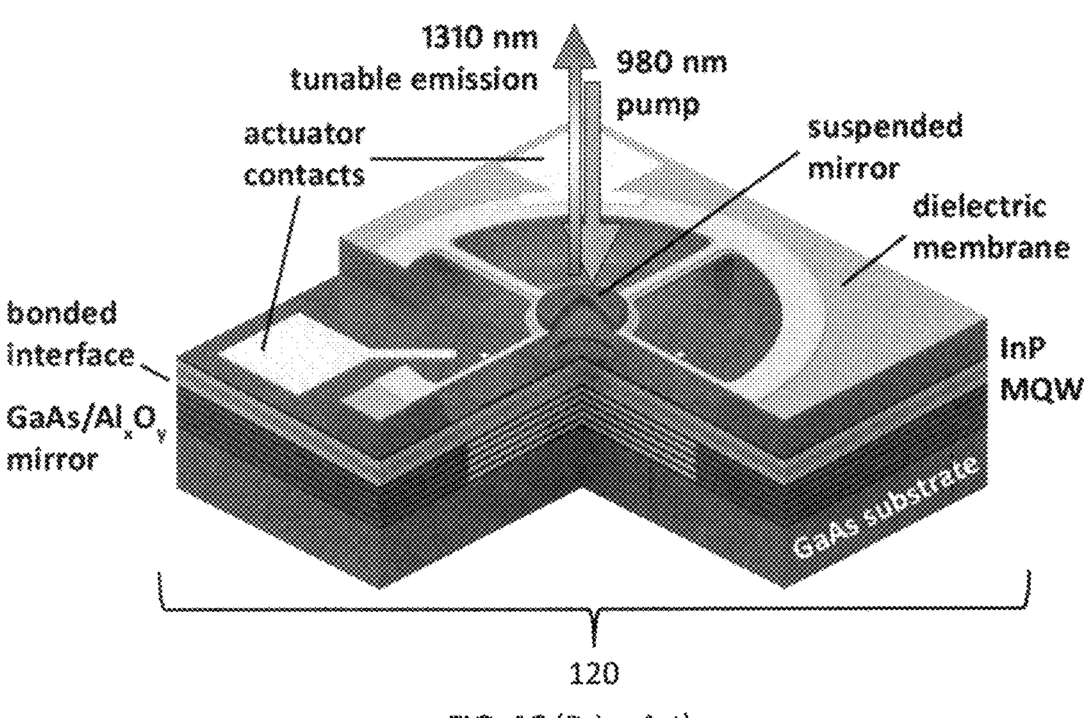
FIG. 1C illustrates a prior art MEMS-VCSEL operating near 1310 nm.
Figure 1D:
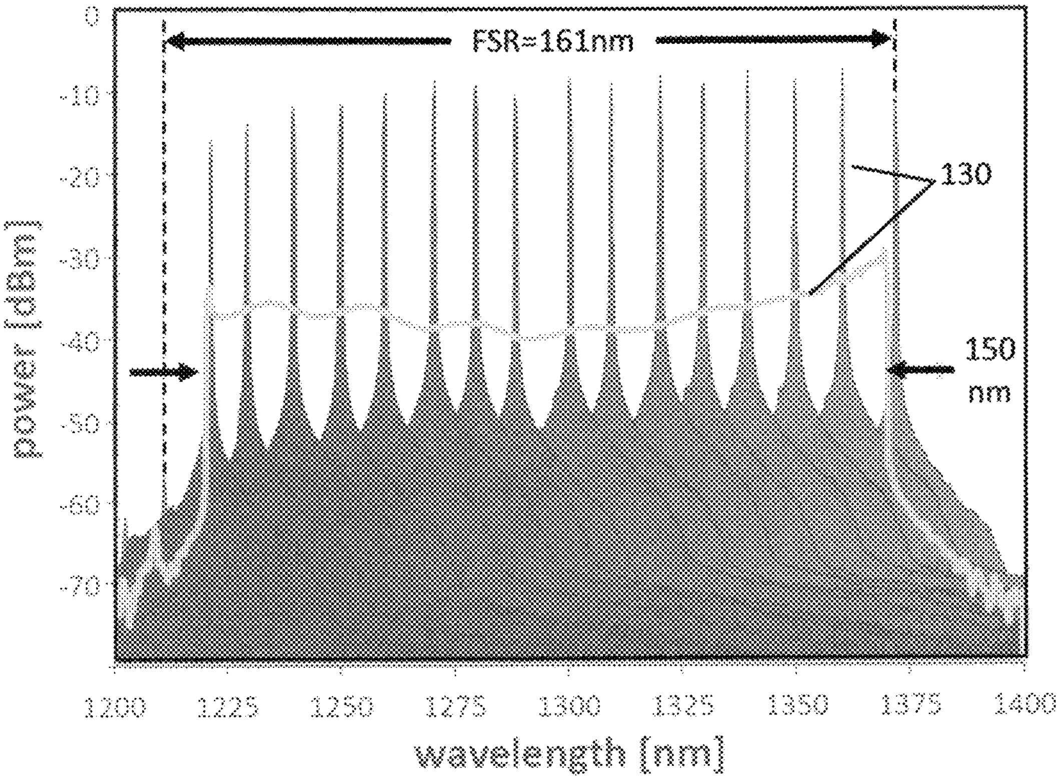
FIG. 1D illustrates a prior art tuning spectrum of the prior art MEMS-VCSEL in FIG. 1C.
Figure 2:
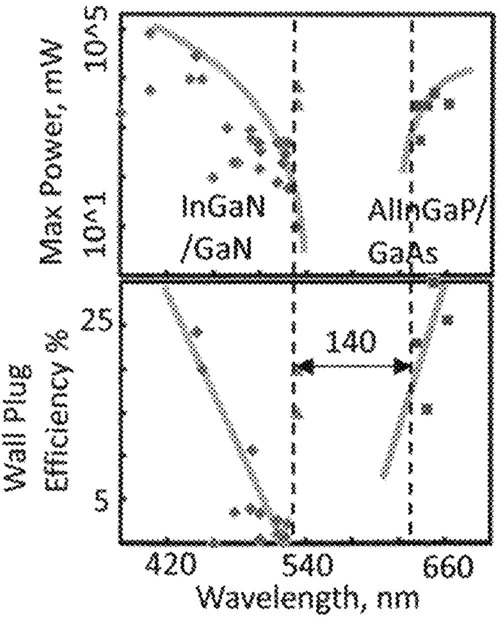
FIG. 2 illustrates the green/yellow gap in prior art semiconductor lasers, illustrating the absence of lasers in the wavelength range from about 530 nm to about 620 nm.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 3:
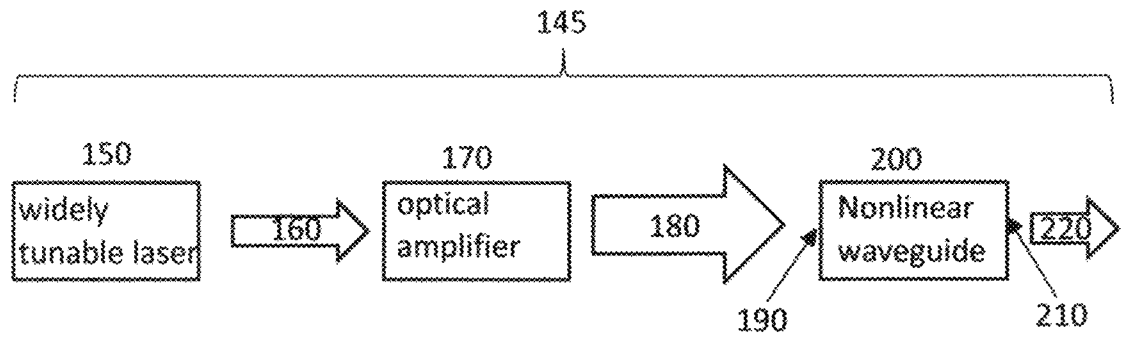
FIG. 3 illustrates a block diagram of a widely tunable frequency doubled light source according to the present invention.

FIG. 3 illustrates a preferred generic embodiment 145 of a widely tunable frequency doubled light source in accordance with the present invention. As shown in FIG. 3, a widely tunable laser 150 emits a tunable fundamental radiation 160 over a fundamental wavelength range having a fundamental center wavelength. Throughout this document we may use the term "pump" interchangeably with "fundamental", so that "pump power" is equivalent to power at the fundamental wavelength or "pump radiation" is equivalent to "fundamental radiation." Referring again to FIG. 3, a broadband optical amplifier 170 amplifies this tunable fundamental radiation to create an amplified widely tunable radiation 180 over the same wavelength range. The widely tunable radiation 180 is coupled into an input side 190 of a nonlinear waveguide 200, which creates a tunable frequency doubled radiation 220 emerging from an output side 210 of the nonlinear waveguide 200. The tunable frequency doubled radiation 220 has a center wavelength that is half the fundamental center wavelength, and an instantaneous wavelength of the frequency doubled radiation 220 is half an instantaneous wavelength of the fundamental radiation 160, where wavelength for both is measured in air. As is well-known to those skilled in the art, frequency doubling is a nonlinear effect which requires high power density and long interaction length for high efficiency. This is accomplished by using a nonlinear waveguide instead of a bulk crystal. The waveguide maintains a small mode field diameter and therefore high power density over a long interaction length that is limited only by scattering and absorption losses. The optical amplifier also increases the optical power density coupled into the nonlinear waveguide, increasing the efficiency of second harmonic generation. In some embodiments, in which the power emitted by the tunable laser 150 is relatively high, the optical amplifier 170 can be eliminated, and emission 160 from the laser 150 can be coupled directly into the waveguide 200.

In an alternate preferred embodiment, the combination of the tunable laser 150 and amplifier 170 might be replaced by an amplified spontaneous emission source, such as a super-luminescent diode. In this case, the frequency doubled radiation 220 would be not tunable frequency doubled emission but instead broadband frequency doubled emission, in which all frequency components are present simultaneously.

A preferred frequency doubled operating wavelength range of the widely tunable frequency doubled source in FIG. 3 is in the range of about 480-600 nm for visible SS-OCT of the human retina, employing a range within about 960-1200 nm for the fundamental wavelength range of the fundamental emission 160. For example, the wavelength range 110 from 995-1122 nm in FIG. 1B would, when coupled with the appropriate optical amplifier and nonlinear waveguide chip, produce frequency doubled radiation in the range of 497.5-561 nm. Another preferred range within 960-1200 nm is 530-600 nm, employing fundamental radiation from 1060-1200 nm. The 530-600 nm is preferred for both high-resolution retinal imaging and retinal oximetry, accessing various isosbestic wavelengths within the retinal tissue, where deoxygenated hemoglobin (Hb) and oxygenated hemoglobin ($HbO_2$) have identical absorption coefficients. Another preferred wavelength range for the frequency doubled emission 220 is in the range of 700-800 nm, enabled by a fundamental wavelength range of 1400-1600 nm. This wavelength range, as discussed above, is essentially devoid of tunable laser technology, and the invention of FIG. 3 solves this long-standing problem. In general, the preferred wavelengths of the widely tunable frequency doubled radiation 220 in FIG. 3 are less than about 1000 nm, since this is where tunable lasers are most challenging to realize. However, as discussed later in this document, the widely tunable frequency doubled tunable light source of FIG. 3 also has suppressed amplified spontaneous noise relative to directly generated emission, so some applications may be envisioned where the radiation 220 includes wavelengths longer than about 1000 nm.

Figure 4:
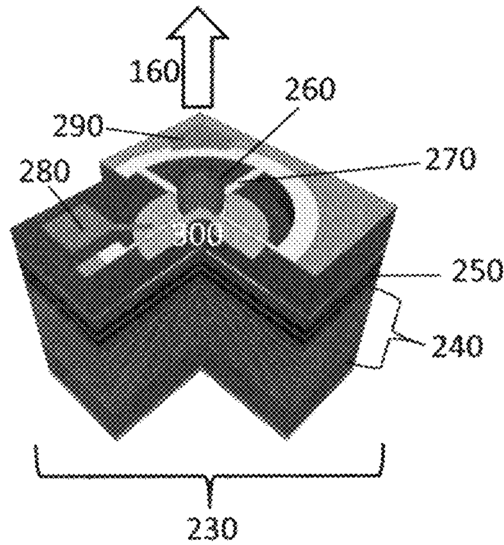
FIG. 4 illustrates a preferred embodiment of the widely tunable laser illustrated in FIG. 3 in the form of a MEMS-VCSEL.

The preferred implementation of the widely tunable laser 150 in the tunable light source of FIG. 3 is a MEMS-tunable VCSEL, a generic version of which is pictured in FIG. 4. Key elements of the MEMS-tunable VCSEL 230 in FIG. 4 are a fixed bottom mirror 240, which in the preferred embodiment is a fully oxidized GaAs/Aluminum oxide (GaAs/AlOx) mirror, a quantum well active region 250, a suspended top mirror 260 disposed on a flexible metallized membrane 270, and bottom and top actuator contacts 280 and 290. The MEMS-VCSEL 230 can be powered by electrical pumping or optical pumping at wavelengths shorter than the range of wavelengths encompassed by the tunable radiation 160. Application of a voltage between actuator contacts 280 and 290 results in contraction of an airgap 300 and tuning of the laser to shorter wavelengths. A preferred operating range of the MEMS-VCSEL 230 is in a range of 960-2000 nm. For frequency doubled operation in the wavelength range of 480-600 nm the quantum well gain region 250 of the MEMS-VCSEL 230 should preferably employ compressively strained Indium Gallium Arsenide (InGaAs) quantum wells, or InGaAs quantum dots for emission within the 960-1200 nm fundamental wavelength range. A primary advantage of using the MEMS-tunable VCSEL 230 as the widely tunable laser 150 in FIG. 3 is that all the desirable properties of MEMS-VCSEL emission, including wide fractional tuning range which can exceed 10%, fast and variable tuning speed which can be <100 kHz to >1 MHz, long coherence length which can be >1 meter, narrow linewidth which can be <1 MHz, and continuous single-mode tuning, are preserved in the frequency doubled radiation 220.

A preferred implementation of the broadband optical amplifier 170 in FIG. 3 is a high saturation power semiconductor optical amplifier (SOA). High saturation power can be obtained by spreading out the mode field dimension in the amplifier, reducing power density while allowing absolute power to increase. Two preferred implementations of a high saturation power SOA are a tapered amplifier, as discussed in (X. Wang et al., "17-W near-diffraction-limited 970-nm output from a tapered semiconductor optical amplifier," *IEEE Photonics Technol. Lett*., vol. 25, no. 2, pp. 115-118, 2013.) and a slab-coupled optical waveguide amplifier (SCOWA), as discussed for example in (P. W. Juodawlkis, J. J. Plant, L. J. Missaggia, K. E. Jensen, and F. J. O'Donnell, "Advances in 1.5-μm InGaAsP/InP slab-coupled optical waveguide amplifiers (SCOWAs)," in *LEOS* 2007-*IEEE Lasers and Electro-Optics Society Annual Meeting Conference Proceedings,* 2007: IEEE, pp. 309-310.). A preferred amplification range of the SOA is within the range of 960-1200, amplifying a preferred wavelength range of the tunable laser emission 160. For broadband operation in this wavelength range, the SOA should preferably employ at least one (InGaAs) quantum well with two confined quantum states, or at least one layer of InGaAs quantum dots.

An alternate preferred implementation of the broadband optical amplifier 170 in FIG. 3 is a rare-earth doped fiber amplifier. For example, an Erbium doped fiber amplifier can amplify fundamental radiation in the range of 1550 nm, and an Ytterbium doped amplifier can provide very high gain amplification in the range of 1050 nm, as described for example in (J. O. White et al., "1.6 kW Yb fiber amplifier using chirped seed amplification for stimulated Brillouin scattering suppression," *Applied optics*, vol. 56, no. 3, pp. B116-B122, 2017.).

A critical consideration in the design of the widely tunable frequency doubled light source of FIG. 3 is the design of the nonlinear waveguide chip 200 to simultaneously achieve high efficiency and broad frequency doubling wavelength range. A preferred implementation of this chip is periodically poled lithium niobate (PPLN), since PPLN has a high non-linear coefficient and is transparent from 350-4500 nm, but alternate nonlinear materials could be employed, including periodically poled lithium tantalate (PPLT) and periodically poled potassium titanyl phosphate (PPKTP). Periodic poling in these materials can be accomplished by depositing electrodes and applying the appropriate electric field strength, as discussed in prior art such as in (L. Chang, Y. Li, N. Volet, L. Wang, J. Peters, and J. E. Bowers, "Thin film wavelength converters for photonic integrated circuits," *Optica*, vol. 3, no. 5, pp. 531-535, 2016.) We also note that aluminum gallium arsenide (AlGaAs) on insulator technology can create high contrast waveguides, in which form birefringent phase matching can be employed to phase match fundamental and frequency doubled wavelengths, instead of periodic poling. GaAs and AlGaAs have very high nonlinear coefficients—higher than PPLN. An example of a GaAs on insulator waveguide is discussed in (E. J. Stanton et al., "Efficient second harmonic generation in nanophotonic GaAs-on-insulator waveguides," *Optics express*, vol. 28, no. 7, pp. 9521-9532, 2020.) Since the phase matching wavelength for AlGaAs on insulator waveguides is a function of waveguide width, SHG bandwidth of AlGaAs on insulator waveguides can be increased by changing the width of the waveguide along the length of the guide. The transparency range of AlAs, however, is for wavelengths greater than about 550 nm, and for GaAs greater than about 870 nm. Since PPLN has greater transparency at shorter wavelengths, it is a preferred material for the implementation of the nonlinear waveguide 200 in FIG. 3.

Figures 5, 6:
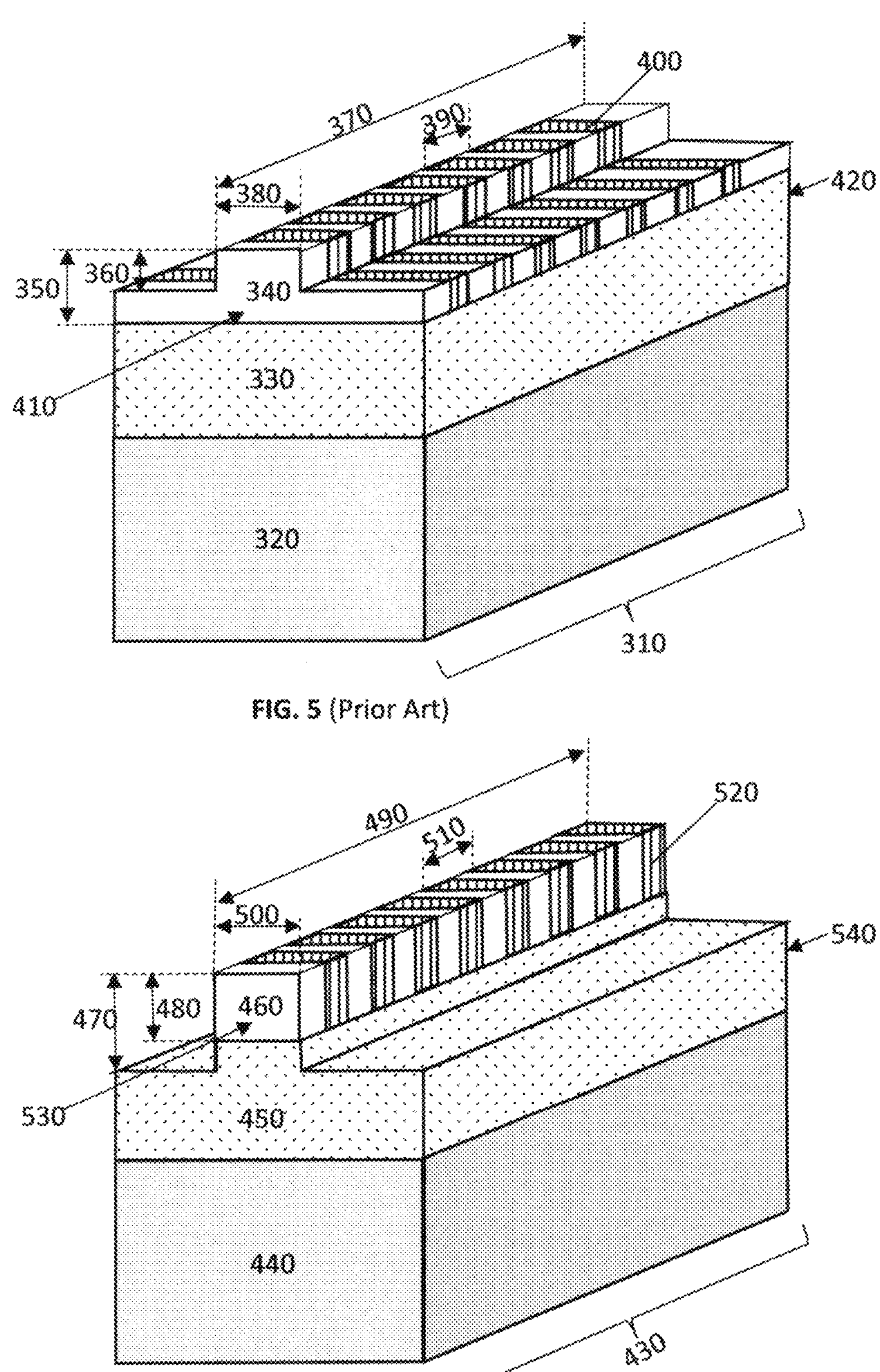
FIG. 5 illustrates a prior art embodiment of a shallow-etched PPLN waveguide configured for frequency doubling.
FIG. 6 illustrates a preferred embodiment of the present invention using a deep-etched PPLN waveguide with group velocity matching for frequency doubling.

FIG. 5 shows a prior art PPLN waveguide 310 from (C. Wang et al., "Ultrahigh-efficiency wavelength conversion in nanophotonic periodically poled lithium niobate waveguides," *Optica*, vol. 5, no. 11, pp. 1438-1441, 2018.). The PPLN guide 310 includes an input side 410 and output side 420, a PPLN core 340 on an SiO2 lower cladding 330, disposed on a silicon substrate 320. In many cases the input and output sides may be interchangeable while still achieving the desired broadband frequency doubling. An upper cladding above the PPLN core 340 is air. The PPLN core 340 has a thickness 350 of about 600 nm, and an etch depth 360 of about 300 nm. A waveguide width 380 is about 1.44 microns (um). The waveguide includes periodically poled regions 400 with a period 390 that is around 4 μm and configured to frequency double fundamental radiation around 1510 nm down to 775 nm. Those skilled in the art recognize that the poling period for frequency doubling from a fundamental wavelength $\lambda_1$ to a frequency doubled wavelength $\lambda_2$ is given by $2\pi/(k_2-2k_1)$, where $k_2=2\pi n_2/\lambda_2$ and $\lambda_1=2\pi n_1/\lambda_1$, where $n_1$ and $n_2$ are effective refractive indices of the waveguide at the wavelengths $\lambda_1$ and $\lambda_2$ respectively. The effective refractive indices of the waveguide can be calculated by any number of commercially available mode solvers, as is also understood by those skilled in the art.

FIG. 6 shows a preferred implementation of a PPLN waveguide 430 according to the present invention. The PPLN guide 430 includes an input side 530 and output side 540, a PPLN core 460 on an SiO2 lower cladding 450, disposed on a silicon substrate 440. In many cases the input and output sides may be interchangeable while still achieving the desired broadband frequency doubling. An upper cladding above the PPLN core 460 is air. The PPLN core 460 has a thickness 480 of about 400 nm, and an etch depth 470 of about 800 nm, proceeding into the SiO2 lower cladding 450. A waveguide width 500 is about 0.53 um. The waveguide includes periodically poled regions 520 with a period 510 that is around 1.42 um and configured to frequency double fundamental radiation around 1130 nm down to 565 nm.

The high refractive index contrast provided by the deeper etching of the waveguide 430 in FIG. 6 relative to the waveguide 310 in FIG. 5 enables matching of the group velocity at the fundamental wavelength near 1130 nm with the group velocity at frequency doubled wavelength near 565 nm. This is a form of dispersion engineering which is possible with high refractive index waveguides. The group velocity matching leads to dramatically improved bandwidth of frequency doubling relative to the case where there is a group velocity mismatch (GVM). Prior art workers, such as described in (M. Jankowski et al., "Ultrabroadband Nonlinear Optics in Dispersion Engineered Periodically Poled Lithium Niobate Waveguides," in 2019 *Conference on Lasers and Electro-Optics* (*CLEO*), 2019: IEEE, pp. 1-2.) have recognized the improved bandwidth achievable with group velocity matching and have demonstrated broadband second harmonic generation (SHG) of femtosecond pulses near 2.1 um. No prior work, however, has demonstrated or proposed using the improved SHG bandwidth afforded by group velocity matching to realize a widely tunable laser according to the present invention, or demonstrated or proposed or shown a viable design for SHG at frequency doubled wavelengths that are less than about 1000 nm.

Figure 7:
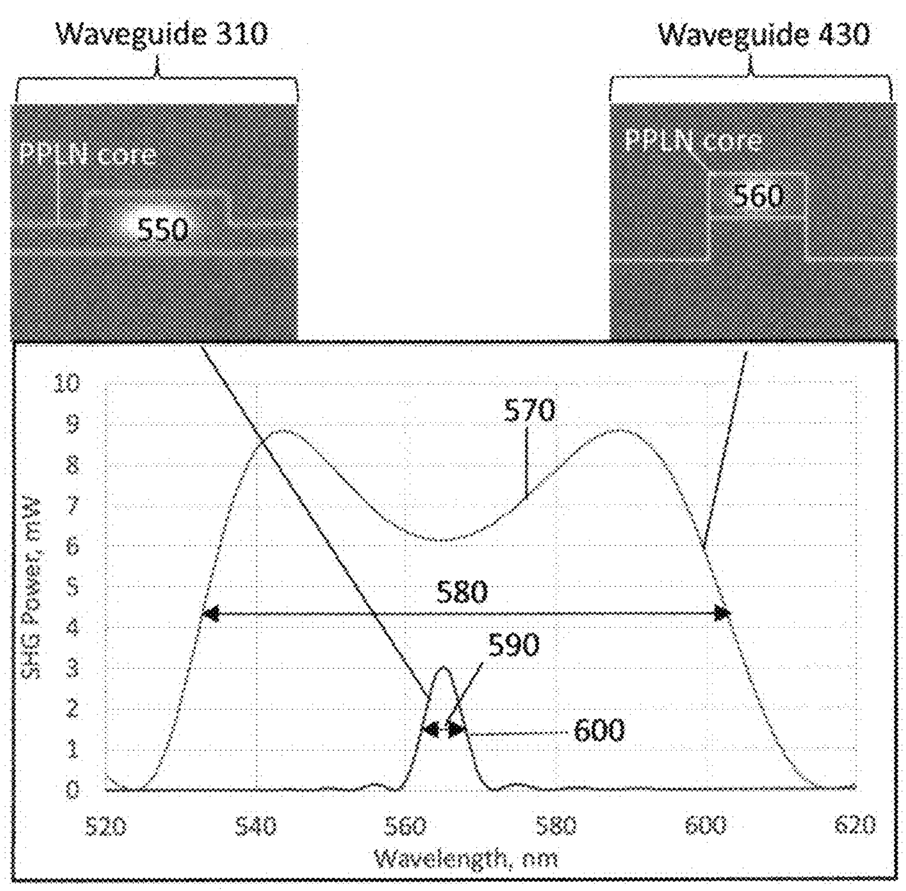
FIG. 7 illustrates frequency-doubled spectra and mode profiles for the prior art PPLN waveguide of FIG. 5 and the present invention waveguide of FIG. 6, in the vicinity of 565 nm.

FIG. 7 shows a calculated second harmonic generation (SHG) spectrum (or equivalently a frequency doubling spectrum) 600 of the prior art waveguide 310, characterized by a full-width at half maximum (FWHM) 590 of about 7 nm, and an SHG spectrum 570 of the present invention waveguide 430, characterized by a FWHM 580 of about 70 nm. FIG. 7 also shows a cross-sectional view of the waveguide 310, having a calculated mode profile 550 largely confined within the PPLN core, and a cross-sectional view of the waveguide 430, having a calculated mode profile 560 largely confined within PPLN core also. The calculated SHG spectrum of FIG. 7 assumes the poling period 390 of the prior art waveguide 310 has been reduced to about 3.3 um, supporting an SHG band centered near 565 nm, and the poling period 510 of the present invention guide 430 is around 1.42 um to also support SHG near 565 nm. The length 370 of the waveguide 310 and the length 490 of the waveguide 430 are both assumed to be 300 um, and the input power at the fundamental wavelength is assumed to be about 170 mW in the calculated spectra of FIG. 7.

Those skilled in the art recognize that the calculated SHG spectra presented in FIG. 7 and elsewhere in this document are not intended to be exact but illustrative of approximate values, and of design differences and relative advantages of one design vs another. The exact values depend on the accuracy of the models employed, such as the refractive index model of various waveguide materials, the waveguide modal profiles, exact values of nonlinear coefficient, and assumed ideal periodic poling. Changes in calculated values of, for example a factor of two, do not change the conclusions or the advantages of the inventions described over the prior art.

The calculation of FIG. 7 shows that a PPLN waveguide according to the present invention can produce up to 9 mW of frequency doubled power, assuming the fundamental coupled power is 170 mw, at green gap wavelengths for which direct generation of laser radiation has thus far not proved possible. The smaller mode field area of the waveguide 430 relative to the waveguide 310 produces a peak theoretical conversion efficiency that is about 3× higher than that of the waveguide 310. The conversion efficiency of the prior art waveguide 310 in the range of 1130 nm fundamental wavelength is about 10000%/W-cm$^2$, and that of the present invention waveguide 430 is about 30000%/W-cm$^2$, where W is the power in watts at the fundamental wavelength or equivalently pump wavelength. This definition of conversion efficiency is for small depletion of the pump power and shows that conversion efficiency goes linearly as the pump power and as the square of the length. So for the 300 um (0.03 cm) present invention guide, the conversion efficiency is 8.8 mW/170 mW=5.17%. This can be calculated from the known ~30000%/W-cm$^2$ by scaling length from 1 cm to 300 um and pump power from 1 W to 170 mW (0.17 W). The FWHM bandwidth 580 of the spectrum 570, associated with the present invention waveguide 430, is also about 10× wider than the FWHM 590 of the spectrum 600, due to matching of the group velocity of the fundamental with the group velocity of the second harmonic. This calculation can be performed by those skilled in the art, with known values of the non-linear coefficeint $d_{33}$ in PPLN and calculated mode profiles and mode overlap using commercial mode solvers, along with knowledge of refractive index as a function of wavelength. In short, the SHG spectrum 570 of the waveguide 430 according to the present invention, shows that fundamental radiation tuned from 1070-1210 nm, can be converted to 535-605 nm radiation in the green gap with a power of greater than >4 mW across the tuning range. Increasing fundamental power above 170 mW will increase SHG power above that shown in FIG. 7, with SHG power increasing as the square of the fundamental power in this nonlinear conversion process. The upper limit of SHG power, assuming unlimited fundamental power, will be set by the reliability of the device at high internal power density. The internal power density of the SHG power will be a greater contributor to degradation than the internal power density of the fundamental power. In preferred embodiments of the this invention, the SHG power over the FWHM tuning range is in a range of about 1-20 mW, and the coupled pump power is in a range of about 100 mW-1 W.

Figure 8:
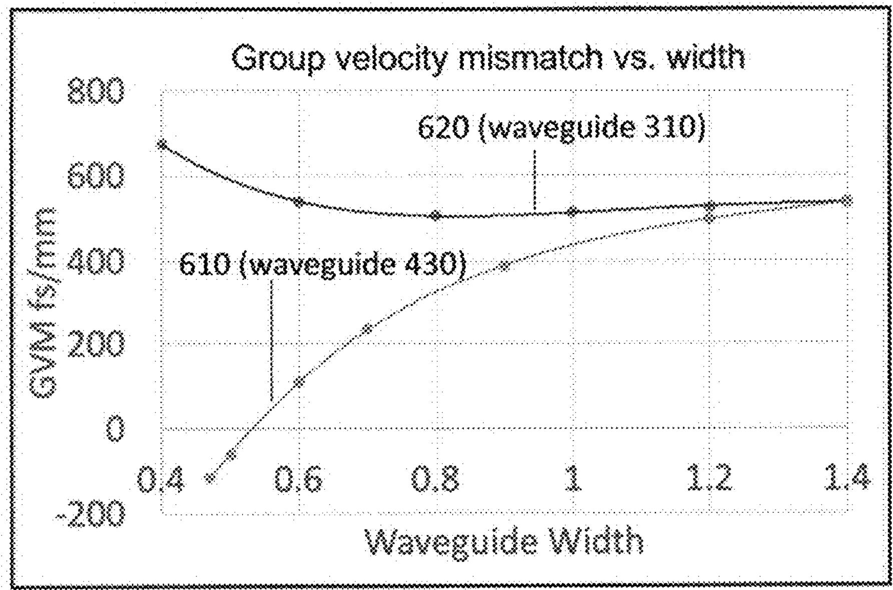
FIG. 8 illustrates a calculation of the group velocity mismatch between a fundamental wavelength and a frequency doubled wavelength as a function of waveguide width for the prior art waveguide of FIG. 5 and present invention waveguide of FIG. 6.

FIG. 8 shows a group velocity mismatch (GVM) as a function of waveguide width 380 of the waveguide 310, in a curve 620, and the GVM as a function of waveguide width 500 of the waveguide 430, in a curve 610. The assumed fundametnal wavelength is 1130 nm and the assumed SHG wavelength is 565 nm. As shown, the present invention waveguide 430 shows a GVM of zero at a width of about 0.53 um, whereas the prior art waveguide 310 never reaches a GVM near zero for any value of width. The zero GVM of the present invention waveguide 430 enables the large FWHM 580 of the spectrum 570, in contrast to the narrow achievable FWHM 590 of the spectrum 600 of the prior art waveguide 310.

Figure 9:
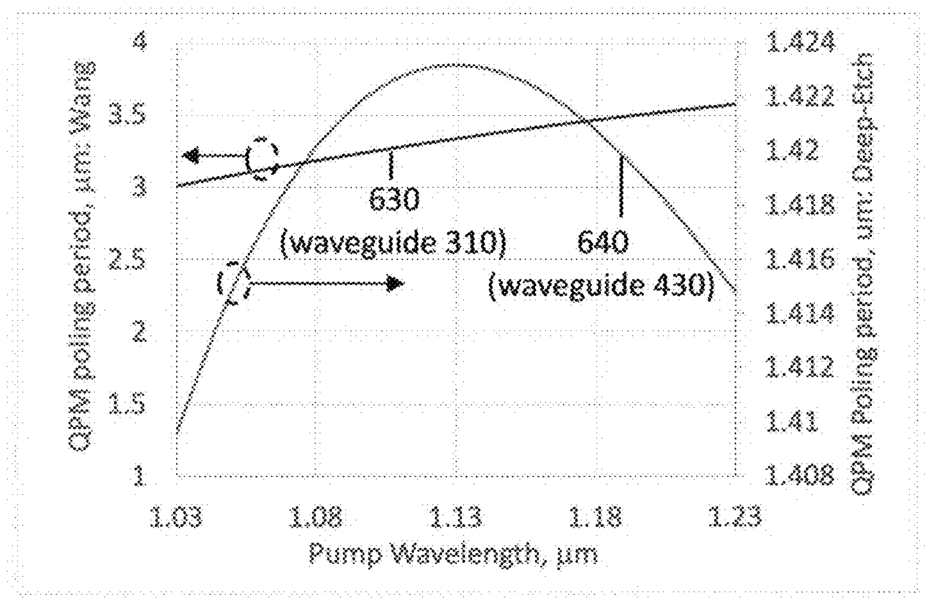
FIG. 9 illustrates a calculation of the poling period as a function of wavelength for the prior art waveguide of FIG. 5 and the present invention waveguide of FIG. 6.

FIG. 9 shows the calculated poling period for maximum second harmonic generation as a function of fundamental wavelength for prior art waveguide 310 in a curve 630 and for the present invention waveguide 430, in a curve 640. The present invention waveguide 430 requires a poling period around 1.42 um for efficient SHG of a pump wavelength around 1.13 um (equivalent to 1130 nm), and the prior waveguide requires a poling period of around 3.3 um. It is worth noting the poling period of the present invention is a non-monotonic function of fundamental wavelength, as shown by the curve 640. This enables further bandwidth increases, since poling period is identical at two wavelengths such as 1.09 um and 1.17 um. This leads to the double-humped spectrum shown in the curve of 570 of FIG. 7, if the poling period is intentionally offset from the value at 1.13 um.

Figures 10, 11, 12:
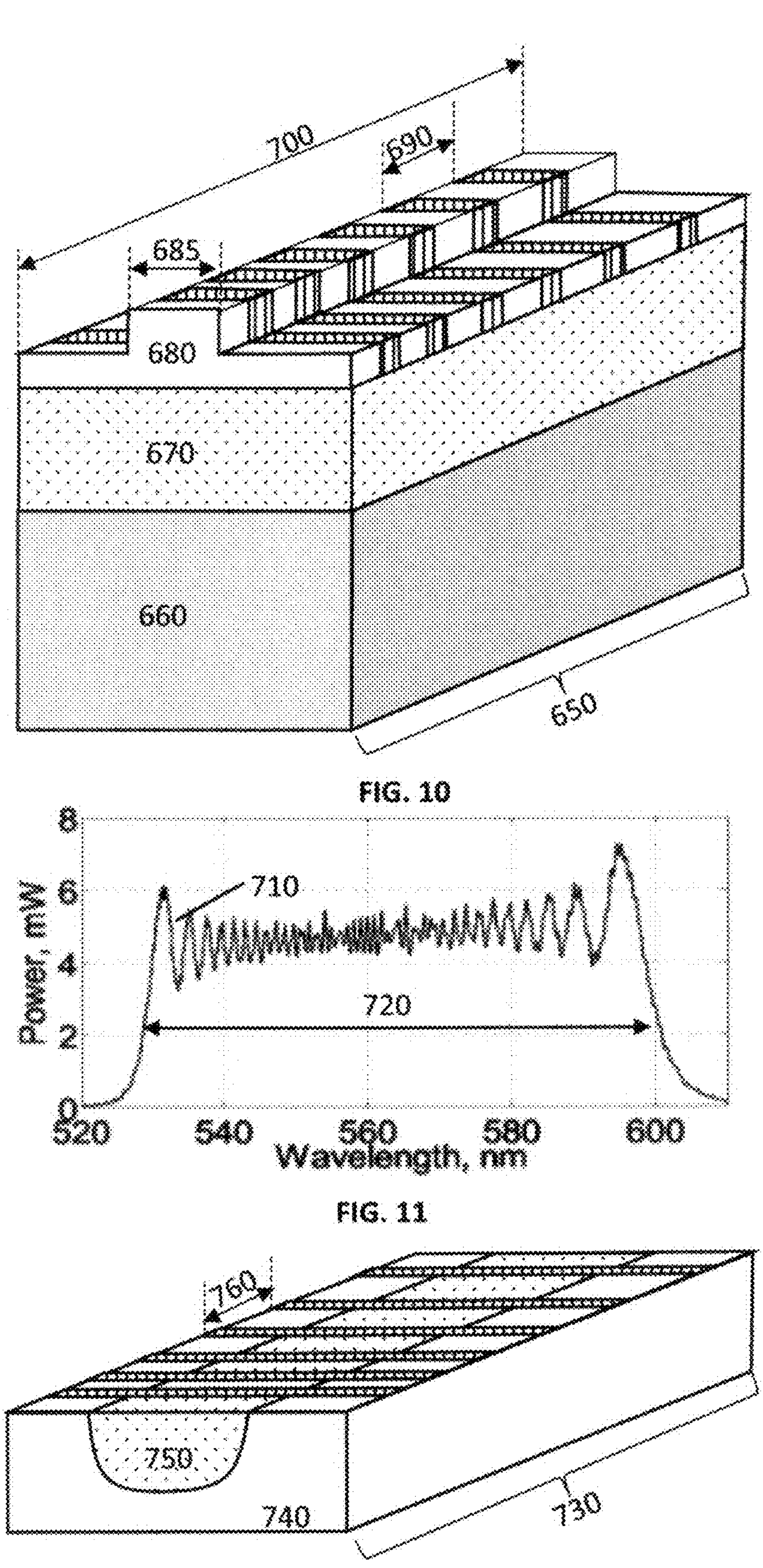
FIG. 10 illustrates a shallow-etched PPLN waveguide according to the present invention, employing a chirped poling period along the length of the waveguide.
FIG. 11 illustrates as a calculation of frequency doubled power as a function of wavelength for a 200 mW fundamental input power and device length of 4 mm, for the PPLN waveguide of FIG. 10.
FIG. 12 illustrates a diffused PPLN waveguide with a chirped poling period according to the present invention.

FIG. 10 shows an alternate preferred PPLN waveguide 650 according to the present invention, disposed on a silicon substrate 660, with a lower SiO2 cladding 670, a lithium niobate core 680, a width 685, and a length 700. The waveguide 650 employs a similar waveguide width and etch depth as the prior art waveguide 310, but with a poling period 690 that varies along the length of the waveguide and is configured for SHG in the vicinity of 565 nm. Although the poling period 690 varies along the length of the waveguide 650, and is therefore technically aperiodic, we still refer to it as a periodically poled lithium niobate (PPLN) guide, since the period varies very only slightly over a small distance, and this is the convention followed by others skilled in the art. We may refer to structures in which the poling period varies as "chirped" periodically poled structures. We also note that instead of chirping the physical period 690, the width 685 of the waveguide can also be varied, which changes the waveguide refractive index and has a similar effect as chirping the physical period 690. We may use the terms "optical period" or "chirping the optical period" to encompass any method of changing the optical path length between poling sections, including changing the physical period 690, or changing the waveguide width 685, or changing the waveguide refractive index by other means. We note that the preferred embodiment of FIG. 10 could also employ an etched waveguide with silicon dioxide or silicon nitride or some other deposited material as the upper cladding, and etching could be done into the cladding layer rather than directly into the Lithium Niobate.

FIG. 11 shows a calculated SHG spectrum 710 of the waveguide 650, assuming a waveguide length 700 of 4 mm, and a fundamental input power of 200 mW from 1040 nm to 1220 nm, generating SHG from 520 nm to 610 nm. As shown, the SHG spectrum exhibits a peak power of about 7 mW and a FWHM around 70 nm. This invention therefore also solves the problem of generating light in the green gap where it has thus far not been possible to generate light directly in semiconductors. For many applications, the spectral ripple present in the SHG spectrum 710 does not present a problem. For other applications like swept source optical coherence tomography, the spectral ripple will create imaging artifacts and may therefore be undesirable. Those skilled in the art recognize that the spectral ripple can be greatly reduced to acceptable levels even for SSOCT by using apodization of the poling function, as described for example in (C. Phillips, C. Langrock, D. Chang, Y. Lin, L. Gallmann, and M. Fejer, "Apodization of chirped quasi-phasematching devices," *JOSA B*, vol. 30, no. 6, pp. 1551-1568, 2013.). This apodization can take various forms, including varying nonlinear interaction strength, the duty cycle of poling, or varying the poling period in a nonlinear fashion with distance along the length of the waveguide 650.

FIG. 12 shows an alternate preferred PPLN waveguide 730 according to the present invention, including a lithium niobate substrate 740, and a proton-diffused region of higher refractive index 750. The waveguide 730 is weakly guiding, and therefore cannot achieve group velocity matching like the waveguide 430, so broad bandwidth can be achieved by chirping the poling period 760 in a fashion similar to the waveguide 650.

The preferred waveguide embodiments 430, 650, and 730 can all achieve broad SHG conversion bandwidth, but have different advantages and disadvantages, making them suitable for different applications. The waveguide 730 relies on established technology, but because diffusion cannot achieve small dimensions, very high internal power densities cannot be achieved. This results in reduced efficiency relative to etched waveguides 430 and 650. The diffused waveguide technology of FIG. 12, however, has demonstrated low internal losses, and increasing device length can improve device efficiency. Prior art workers employing diffused waveguides have demonstrated an efficiency of ~150%/W-cm$^{2}$, as described for example in (K. R. Parameswaran, R. K. Route, J. R. Kurz, R. V. Roussev, M. M. Fejer, and M. Fujimura, "Highly efficient second-harmonic generation in buried waveguides formed by annealed and reverse proton exchange in periodically poled lithium niobate," *Optics Letters*, vol. 27, no. 3, pp. 179-181, 2002.) Other limitations of diffused waveguide technology are limited power handling capability and no possibilty of dispersion engineering.

The shallow etched waveguide 650 also does not allow for significant dispersion engineering and group velocity matching, but it enables low propagation losses and smaller mode field diameter and therefore substantially higher conversion efficiency than proton diffused waveguides, as well as much higher power handling capability. The waveguide 650 according to the present invention, has a theoretical conversion efficiency of about 10000%/W-cm$^2$ in the case of a uniform poling period. The highest conversion efficiency is provided by the deep-etched waveguide due to the small mode field diameter. The deep-etched waveguide 430 according to the present invention provides a theoretical conversion efficiency of about 30000%/W-cm$^2$. Additionally, the dispersion engineering enables group velocity matching and wide SHG conversion bandwidth without the use of a chirped waveguide. This enables very short device length. The potential disadvantage of the deep-etched guide is sensitivity to sidewall scattering losses. It is possible to achieve a design between the shallow etched guide 650 and the deep-etched guide 430, in which group velocity mismatch is reduced between fundamental and SHG, but not zero, broadening bandwidth to some degree, with further bandwidth increases achieved by a modest amount of grating chirp. This can be accomplished with a deep etch but wider waveguide width, as for example in the 0.78 um width waveguide shown in the curve 610 in FIG. 8, where a GVM of 300 femto-seconds/millimeter (fs/mm) is less than half that achievable in bulk lithium niobate.

Figure 13:
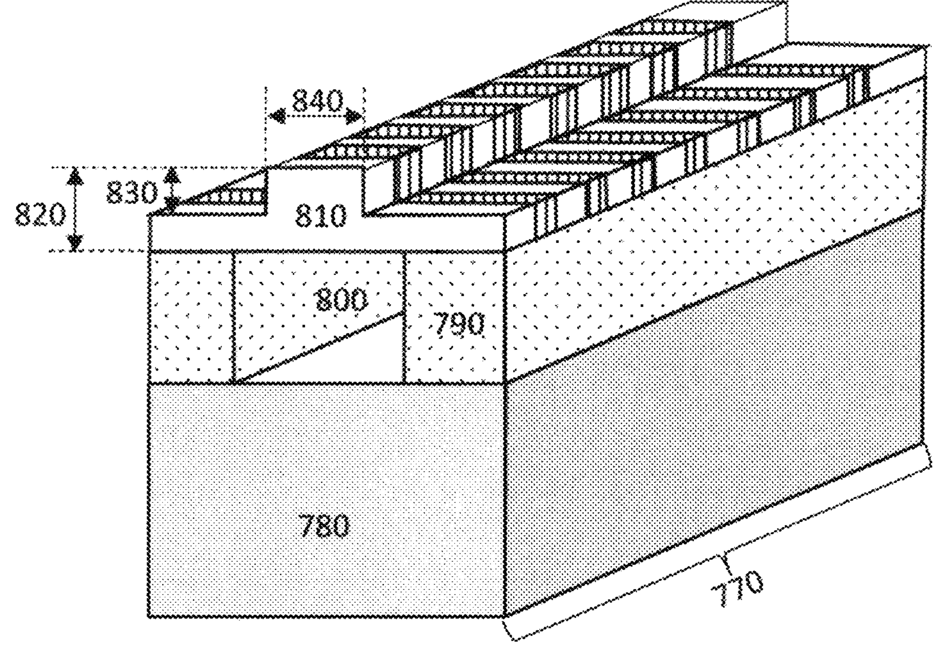
FIG. 13 illustrates a high contrast PPLN waveguide with upper and lower air cladding according to the present invention.

FIG. 13 illustrates another preferred embodiment 770 of a PPLN waveguide according to the present invention. The waveguide 770 includes a silicon substrate 780, an SiO2 mechanical support layer 790 with an etched channel to create an airspace 800 which forms a lower cladding of the waveguide, and a PPLN core 810 which has a thickness 820 in a range of about 400-700 nm, and etch depth 830 in a range of about 300-600 nm and width 840 in a range of about 500-1000 nm. An upper cladding of the waveguide 770 is also air. The waveguide 770 provides exceptionally high index contrast and can be designed for group velocity matching.

The PPLN waveguides described with the aid of FIGS. 5-13 have included examples configured to access green gap wavelengths in the range of 530-620 nm. Those skilled in the art recognize some details, such as the silicon substrate employed in FIGS. 6,10,13 could be replaced by lithium niobate or some other material without substantially affecting device performance or operating principles. As understood by those skilled in that art, the principles and designs discussed here can easily be translated to any wavelength range in which the fundamental radiation and frequency doubled radiation are within the 350-4500 nm transparency range of PPLN or within the transparency range of other well-known periodically poled nonlinear crystals such as PPLT and PPKTP or the transparency range of AlGaAs. The approaches here have maximum utility when the frequency doubled radiation is in the range less than about 1000 nm, since widely tunable direct radiation is generally not otherwise possible, but a few applications in which the SHG radiation is >1000 nm may also benefit from the invention here, as discussed further below with respect to FIGS. 14-18.

Figure 14:
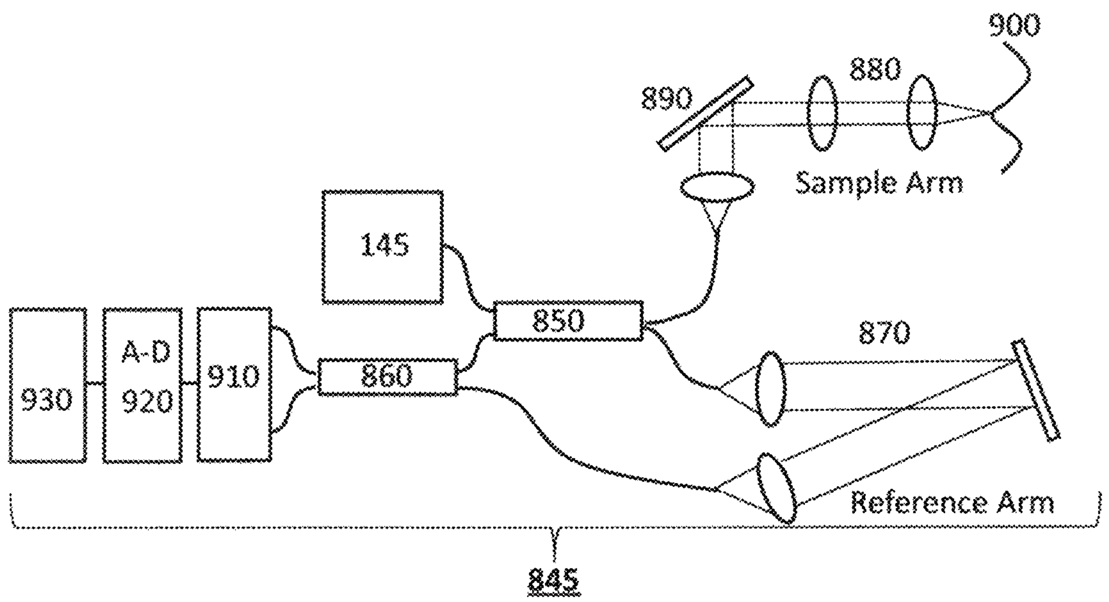
FIG. 14 illustrates a swept source optical coherence tomography system according to the present invention.

The widely tunable frequency doubled tunable light source according to the present invention described with the aid of FIGS. 3-13 enables several optical systems. FIG. 14 illustrates a system for swept source optical coherence tomography (SSOCT) 845 according to the present invention, comprising the widely tunable frequency doubled light source 145 from FIG. 3, configured as a wavelength swept source sweeping wavelength respectively, couplers 850 and 860, a sample arm 880 terminating in a sample under evaluation 900 and including a beam steering galvo mirror 890, a reference arm 870, a balanced detector 910, an A-D converter 920, and signal processing 930 which reconstructs an image of the sample. The wavelength swept source ideally sweeps the wavevector $k=2\pi/\lambda$ linearly with time, as is desirable to maximally utilize A-D bandwidth in SS-OCT. The beam steering galvo mirror 890 enables 3-dimensional imaging, and could be replaced by a non-mechanical beam steering mechanism. A preferred embodiment of the SSOCT system of FIG. 14 is for visible SSOCT within a range of about 500-600 nm, which enables retinal oximetry and structural and functional imaging of the human retina. Another advantage of SSOCT at visible wavelengths is increased imaging resolution relative to near infrared wavelengths near 800 nm or 1050 nm traditionally used for retinal imaging due to axial resolution for a Gaussian spectral shape being given by $0.44\lambda^2/\Delta\lambda$, where $\lambda$ is a central wavelength of the illuminating radiation, and $\Delta\lambda$ is a FWHM wavelength bandwidth. In a preferred embodiment of the SS-OCT system of FIG. 14, the frequency doubled wavlength swept source is spectrally shaped to create a Gaussian spectrum. For example, the spectrum 570 in FIG. 7 could be made Gaussian by controlling a power supplied to the tunable laser 150 or broadband amplifier 170 in FIG. 3 during tuning to shape the power as a function of wavelength to a more Gaussian profile. Another preferred wavelength range for the system of FIG. 14 is within a frequency doubled wavelength range of 600-800 nm, using fundamental radiation within a fundamental wavelength range of 1200-1600 nm. which also provides relatively high resolution and increased allowable exposure on the human retina. Although the retina is the envisioned sample in the preferred embodiment, the sample being imaged could also be other in-vivo or ex-vivo biological tissue, or a non-biological sample. One further advantage of the SSOCT system of FIG. 14 is not only the availability of new wavelengths for SSOCT, but also a suppression of amplified spontaneous emission (ASE) background noise which can limit sensitivity of SSOCT systems. The nonlinear frequency doubling process suppresses weak signals relative to stronger ones, so the widely tunable frequency doubled light source will have less ASE background than the amplified widely tunable source of fundamental radiation. We can generalize this principle to a method for reducing spontaneous emission noise in lasers operating at a wavelength $\lambda_2$, comprising creating a laser emitting fundamental radiation at a fundamental wavelength $\lambda_1=2*\lambda_2$, and passing that laser at through a non-linear frequency doubling element to create a noise suppressed laser emission at the wavelength $\lambda_2$.

Figure 15:
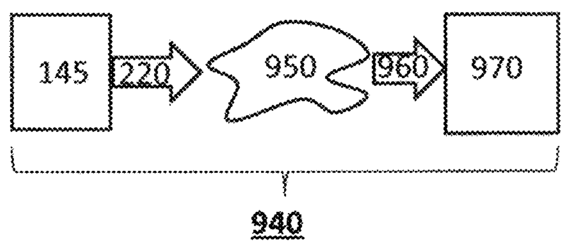
FIG. 15 illustrates a system for optical spectroscopy according to the present invention.

FIG. 15 illustrates a system for optical spectroscopy 940 according to the present invention, comprising the frequency doubled tunable light source 145 of FIG. 3, emitting a frequency doubled tunable radiation spectrum 220, passing through a sample under analysis 950, being transformed into a transmitted radiation spectrum 960, which impinges on a detection and signal processing portion of the system 970, which uses the transmitted spectrum 960 along with the incident spectrum 220 to infer a chemical composition of the sample 950. The system 940 is shown in transmission mode, but a reflection or scattering spectrum could also be measured. The sample 950 can be a solid, liquid, gas, plasma, or any substance in any state of matter. In addition, a variable tuning speed of the frequency doubled tunable light source, especially when using the MEMS-VCSEL 230 as the tunable laser 150, can be used to scan across an optical spectrum at variable speed, slowing down information rich regions and speeding up in less-information rich regions, to obtain a desired signal to noise ratio while minimizing measurement time.

The tunable light source 145, which preferably employs the MEMS-VCSEL 230 as the tunable laser 150, also has the ability to do transient spectroscopy at very high speeds. The spectrum could be triggered in response to a non-repetitive external event such as an explosion, and transient spectroscopy obtained. Other transient spectroscopy applications include analysis of engine combustion.

Figure 16:
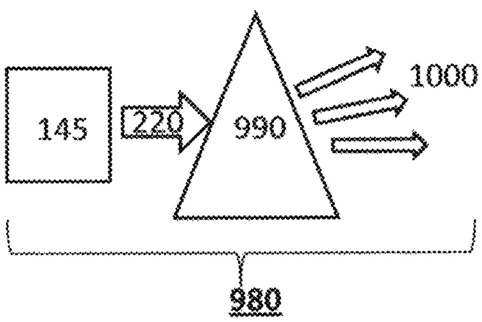
FIG. 16 illustrates a system for optical beam steering according to the present invention.

FIG. 16 illustrates a system for optical beam steering 980 according the present invention, in which the tunable radiation 220 from the frequency doubled tunable light source 145 impinges on a dispersive element 990, such as a prism or a grating, creating an angle of light transmitted or diffracted by the dispersive element that varies as a function of wavelength. This enables high speed non-mechanical beam steering at wavelengths that are not currently accessible in the prior art.

Another system for spectroscopy at various spatial locations could employ the widely tunable frequency doubled light source of FIG. 3, in conjunction with a steering mirror that steers independent of wavelength, such as a mechanical steering mirror. This would enable a continuously variable color projector or spectroscopy over a wide field of view, or hyperspectral imaging.

Figure 17:
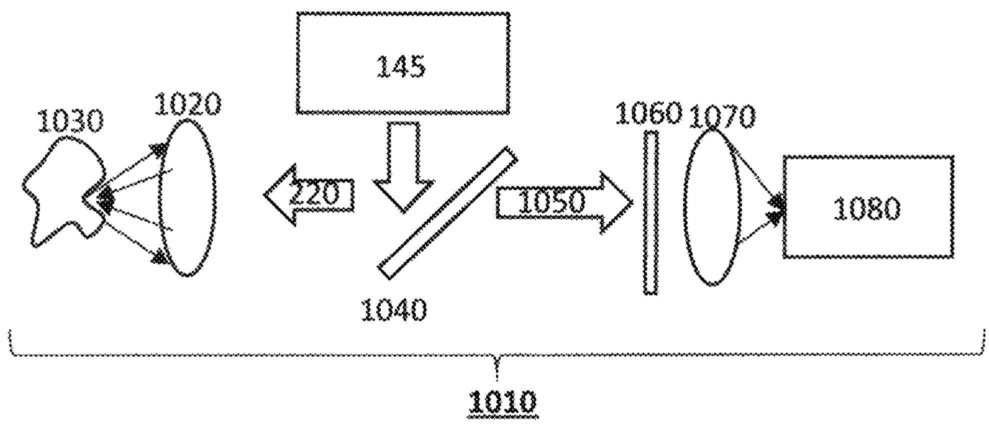
FIG. 17 illustrates a system for swept source Raman spectroscopy according to the present invention.
Figure 18:
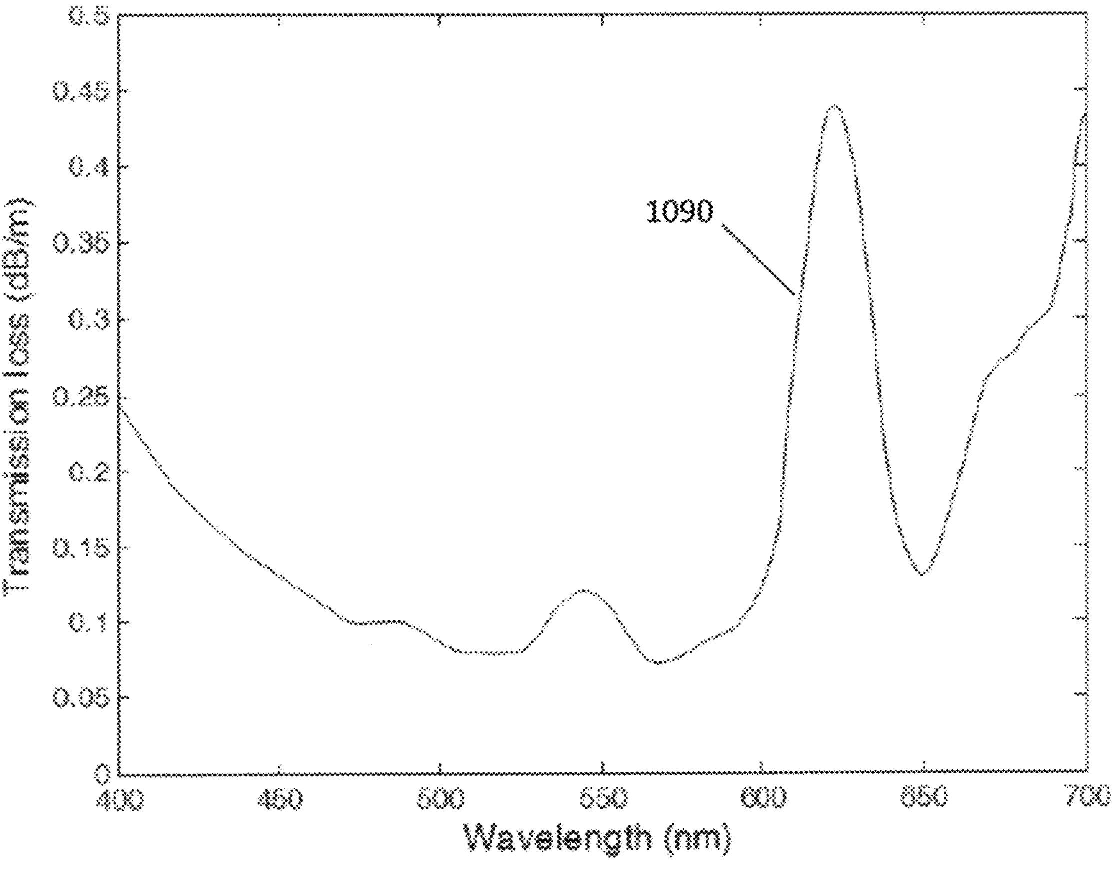
FIG. 18 illustrates an optical loss spectrum for plastic optical fiber for a wavelength division multiplexed communication system according to the present invention.

FIG. 17 illustrates a system 1010 for swept source Raman spectroscopy according the present invention. A prior art swept source Raman spectroscopy is described in (A. H. Atabaki, W. F. Herrington, C. Burgner, V. Jayaraman, and R. J. Ram, "Low-power swept-source Raman spectroscopy," *Optics Express*, vol. 29, no. 16, pp. 24723-24734, 2021.). The system 1010 employs the widely tunable frequency doubled light source 145 emitting frequency doubled radiation 220 as an excitation source which is reflected by a dichroic mirror 1040 and passes through a high numerical aperture lens 1020 and impinges on a sample 1030. The sample 1030 emits a Raman back emission 1050 that is collected and collimated by the lens 1020, is spectrally shifted relative to the excitation 220 and therefore passes through the dichroic mirror 1040. The Raman emission 1050 passes through a bandpass filter 1060, and is focused by a focusing lens 1070 onto a detection/signal processing portion 1080 of the system 1010, to infer a chemical composition of the sample 1030. An advantage of the system 1010 over prior art swept source Raman spectroscopy is a reduction in an amplified spontaneous emission (ASE) background in the frequency doubled radiation 220 relative to the amplified widely tunable fundamental radiation 180 or the widely tunable radiation 160 previously employed in swept source Raman spectroscopy. The nonlinear conversion process suppresses the weaker ASE signal relative to the stronger lasing signal. This suppression of the ASE is applicable more generally to Raman spectroscopy, and not only to swept source Raman spectroscopy, as background ASE is a noise limitation which limits detection of weak Raman signals.

Another preferred optical system embodiment according the present system is a system for wavelength division multiplexed (WDM) optical communication including an optical transmitter/modulator, transmission medium, and optical receiver/demodulator. This WDM optical communication system according to the present invention employs the widely tunable frequency doubled light source 145 of FIG. 3 in the optical transmitter. This enables transmission of information at wavelengths not accessible by direct generation with semiconductor lasers. For example a system using plastic optical fiber, having a transmission loss spectrum 1090 shown in FIG. 18, could employ wavelengths in the range of 500-600 nm where the transmission loss of plastic optical fiber is minimized. Underwater communication systems, such as undersea communication, could also employ the widely tunable frequency doubled light source 145 of FIG. 3, as an optimal range for undersea communication is from about 460 nm to about 550 nm.

Figure 19:
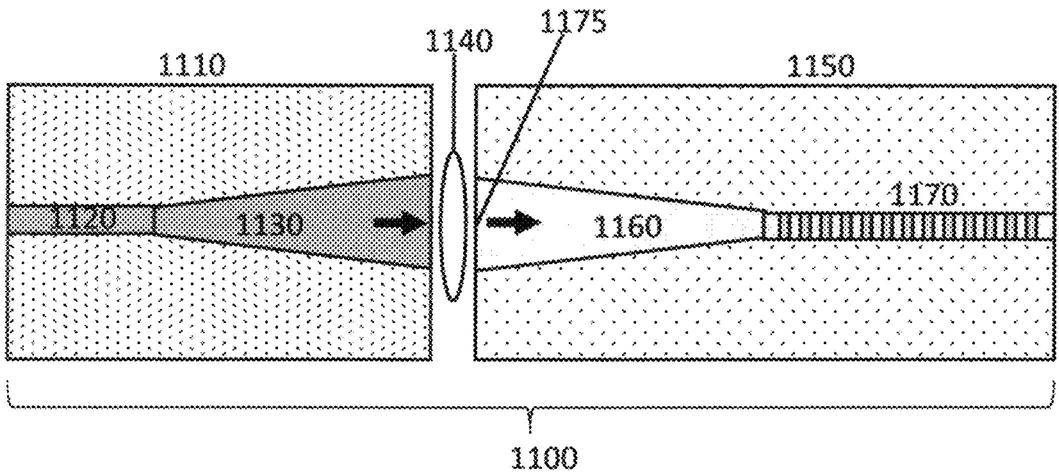
FIG. 19 illustrates a preferred embodiment according to the present invention, in which an output of a tapered semiconductor optical amplifier is coupled to a lithium niobate chip comprising an adiabatic mode transformer and a PPLN waveguide.

The present invention waveguides 430, 650, 770 and related designs have very small dimensions, which makes optical coupling into and out of these waveguides challenging. One solution to this problem is to include adiabatic mode transformers on a lithium niobate platform that includes a non-periodically poled mode transformer section coupled to the PPLN waveguide. FIG. 19 shows a preferred embodiment 1100 in which a tapered semiconductor optical amplifier (SOA) 1110, comprising a straight section 1120 and a tapered section 1130 is coupled through a cylindrical coupling lens 1140 to a lithium niobate waveguide chip 1150, comprising an adiabatic mode transformer 1160 and PPLN waveguide 1170. Another adiabatic mode transformer could be included on an output side of the PPLN waveguide. An entrance aperture 1175 of the adiabatic mode transformer 1160 is well matched to a highly astigmatic mode profile coming out of the tapered SOA. This simplifies the cylindrical coupling lens 1140. The adiabatic mode transformer 1160 transforms the mode to improve a coupling efficiency of the mode to the PPLN waveguide 1170. FIG. 19 illustrates the mode transformer 1160 schematically. Detailed design of adiabatic mode transformers is well-known to those skilled in the art and is described for example in (I. Moerman, P. P. Van Daele, and P. M. Demeester, "A review on fabrication technologies for the monolithic integration of tapers with III-V semiconductor devices," *IEEE J. Sel. Top. Quantum Electron*., vol. 3, no. 6, pp. 1308-1320, 1998.). The lithium niobate mode transformer 1160 and PPLN waveguide 1170 could both be integrated on silicon, as are the waveguides 430, 650, and 770. Similarly the tapered SOA 1110 could be heterogeneously integrated on the same silicon wafer. Thus the combination of amplifier and nonlinear waveguide, listed as key elements 170 and 200, respectively, of the widely tunable frequency doubled light source 145 pictured in FIG. 3, could be co-integrated compactly in a silicon photonics platform. In another preferred embodiment, the amplifier 1110 could be directly attached to the Lithium Niobate chip 1150, enabling direct edge coupling without the lens 1140.

Figure 20:
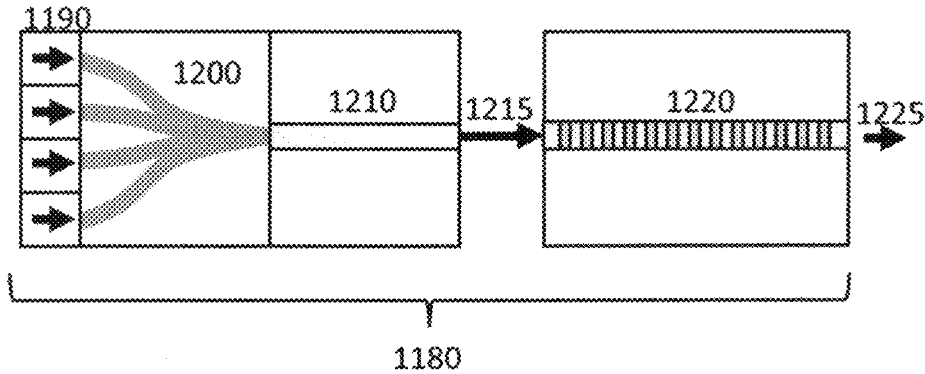
FIG. 20 illustrates a preferred array embodiment in which an array of N fundamental lasers is combined through a wavelength division multiplexer, amplified and coupled to a PPLN waveguide to generate N components of frequency doubled radiation.

Although the present invention has been described as comprising a single widely tunable frequency doubled light source as in FIG. 3, related embodiments could include array configurations. FIG. 20 illustrates a preferred configuration 1180 according to the present invention, in which a wavelength stepped array of N lasers 1190 emitting N components of fundamental radiation over N wavelength ranges with N fundamental center wavelengths is combined through a wavelength division multiplexer 1200 onto a common optical path. All N of these fundamental radiation components are amplified by an optical amplifier 1210, generating amplified fundamental WDM radiation 1215, which is then coupled to a PPLN waveguide 1220 engineered for broadband frequency doubling using PPLN designs described for example with respect to FIGS. 6 and 10. An output 1225 of the PPLN waveguide 1220 contains N components of frequency doubled WDM radiation, each with a center wavelength that is half a center wavelength of one of the N fundamental center wavelengths. The laser array 1190 could be comprised of multiple tunable lasers or multiple fixed wavelength lasers. In a preferred embodiment, the laser array is an array of tunable MEMS-VCSELs, and in another preferred embodiment, the laser array is an array of distributed feedback (DFB) or distributed bragg reflector (DBR) lasers, including SGDBR lasers.

Figure 21:
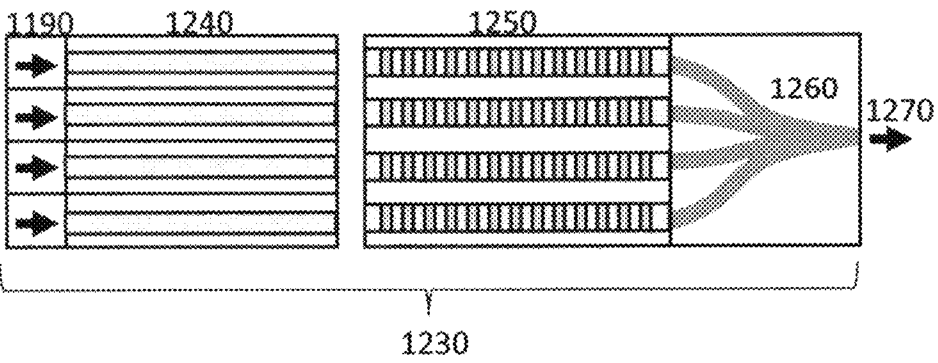
FIG. 21 illustrates a preferred array embodiment in which an array of N fundamental lasers is coupled to an array of N optical amplifiers, which is in turn coupled to an array of N PPLN waveguides. The output of the N PPLN waveguides are combined on to a common optical path through a wavelength division multiplexer to generate wavelength division multiplexed frequency doubled radiation.

FIG. 21 illustrates another preferred array configuration 1230 according to the present invention. The wavelength stepped laser array 1190 is coupled to an array of N optical amplifiers 1240, which is in turn coupled to an array of N PPLN waveguides 1250 generating N components of frequency doubled radiation. These are combined onto a common optical path through a WDM 1260 to generate emitted light 1270 with N components of frequency doubled wavelength division multiplexed radiation. Each of the N components of frequency doubled radiation has a center wavelength that is half the wavelength of one of the N fundamental center wavelengths.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A tunable light source operative to emit tunable frequency doubled radiation over a frequency doubled wavelength range, having a frequency doubled center wavelength, said tunable light source comprising:

a widely tunable semiconductor laser operative to emit fundamental radiation over a fundamental wavelength range having a fundamental center wavelength that is twice said frequency doubled center wavelength, wherein said fundamental wavelength range exceeds 1% of said fundamental center wavelength, and an etched nonlinear waveguide comprising a nonlinear material waveguide core designed to simultaneously frequency double all wavelengths over at least said fundamental wavelength range, wherein said tunable frequency doubled radiation emerges from an output side of said etched nonlinear waveguide, said fundamental radiation enters an input side of said etched nonlinear waveguide, wherein said etched nonlinear waveguide has a group velocity mismatch (GVM) between said fundamental center wavelength and said frequency doubled center wavelength that passes below 300 femtoseconds/mm as a function of a width of said etched nonlinear waveguide, and wherein the frequency doubled wavelength range of the tunable frequency doubled radiation that is emitted by the etched nonlinear waveguide includes frequency-doubled wavelengths between 520 nm and 610 nm.

2. The tunable light source of claim 1, wherein nonlinear material of the nonlinear material waveguide core is periodically poled lithium niobate (PPLN).

3. The tunable light source of claim 1, wherein said nonlinear material of the nonlinear material waveguide core comprises one of a list consisting of periodically poled lithium tantalate (PPLT), periodically poled potassium titanyl phosphate (PPKTP), gallium arsenide (GaAs), and Aluminum Gallium Arsenide Al(x)Ga(1−x)As.

4. The tunable light source of claim 1, further comprising a semiconductor optical amplifier providing optical amplification over said fundamental wavelength range.

5. The tunable light source of claim 1, wherein said widely tunable semiconductor laser is a micro-electromechanical systems tunable vertical cavity surface emitting laser (MEMS-VCSEL).

6. The tunable light source of claim 1, wherein said widely tunable semiconductor laser is a vernier tuned distributed bragg reflector laser (VTDBR).

7. The tunable light source of claim 1, wherein said widely tunable semiconductor laser is an external cavity tunable laser.

8. The tunable light source of claim 1, wherein said width of said etched nonlinear waveguide is less than 1 micron, and wherein a thickness of a lithium niobate layer in said etched nonlinear waveguide is in a range of 0.2-0.7 microns.

9. The tunable light source of claim 1, where said etched nonlinear waveguide is clad by air on a top side and by SiO2 on a bottom side.

10. The tunable light source of claim 1, wherein said etched nonlinear waveguide is etched completely through the nonlinear material waveguide core into an underlying SiO2 cladding layer.

11. The tunable light source of claim 1, wherein said etched nonlinear waveguide is etched partially through the nonlinear material waveguide core stopping short of an SiO2 cladding layer.

12. The tunable light source of claim 1, wherein a poling period of the etched nonlinear waveguide varies along a length of said etched nonlinear waveguide, and wherein a nonlinear interaction strength along said etched nonlinear waveguide is varied with position in such a manner as to reduce a spectral ripple in a second harmonic generation spectrum of said etched nonlinear waveguide relative to a uniform nonlinear interaction strength.

13. The tunable light source of claim 1, wherein a poling period of said etched nonlinear waveguide varies nonlinearly with position along a length of said etched nonlinear waveguide, in a manner which reduces a spectral ripple relative to a linear variation of said poling period.

14. The tunable light source of claim 1, wherein said widely tunable semiconductor laser emits tunable fundamental radiation that is repetitively swept over said fundamental wavelength range at a repetition frequency, such that said tunable frequency doubled radiation is repetitively swept over said frequency doubled wavelength range at said repetition frequency.

15. A system for swept source optical coherence tomography, comprising:

a source of wavelength swept radiation;

a radiation director configured to direct said wavelength-swept radiation to a reference path and a sample;

an optical detector configured to detect an interference signal between light back-reflected from said sample and light traversing said reference path; and signal processing circuitry configured to perform signal processing of said interference signal to infer at least one of a list comprising structural and functional information about said sample, wherein said wavelength swept radiation is the repetitively swept frequency doubled radiation of claim 14.

16. The system of claim 15, wherein said frequency doubled wavelength range is within a range from 520 nm to 600 nm.

17. The tunable light source of claim 1, wherein an amplified spontaneous emission (ASE) background level of said tunable frequency doubled radiation is substantially lower than an ASE background level of said fundamental radiation.

18. The system of claim 15, wherein said sample is an in-vivo human eye, and said functional information comprises information obtained through retinal oximetry.

19. A system for swept source optical coherence tomography, comprising:

a source of wavelength swept radiation;

a radiation director configured to direct said wavelength-swept radiation to a reference path and a sample;

an optical detector configured to detect an interference signal between light back-reflected from said sample and light traversing said reference path; and signal processing circuitry configured to perform signal processing of said interference signal to infer at least one of a list comprising structural and functional information about said sample, wherein said source of wavelength swept radiation comprises:

a widely tunable semiconductor laser operative to emit fundamental radiation over a fundamental wavelength range having a fundamental center wavelength that is twice a frequency doubled center wavelength, wherein said fundamental wavelength range exceeds 1% of said fundamental center wavelength; and an etched nonlinear waveguide comprising a nonlinear material waveguide core designed to simultaneously frequency double all wavelengths over at least said fundamental wavelength range, wherein tunable frequency doubled radiation emerges from an output side of said etched nonlinear waveguide, said fundamental radiation enters an input side of said etched nonlinear waveguide, and said etched nonlinear waveguide has a group velocity mismatch (GVM) between said fundamental center wavelength and said frequency doubled center wavelength that passes below 300 femtoseconds/mm as a function of a width of said etched nonlinear waveguide.

* * * * *